(12) United States Patent
Kishimoto et al.

(10) Patent No.: US 11,822,757 B2
(45) Date of Patent: Nov. 21, 2023

(54) DISPLAY DEVICE AND METHOD OF MANUFACTURING THE SAME

(71) Applicant: SAMSUNG DISPLAY CO., LTD., Yongin-si (KR)

(72) Inventors: Hirotsugu Kishimoto, Hwaseong-si (KR); Da Som Gu, Asan-si (KR); Yong Chan Jeon, Cheonan-si (KR); Sung Ki Jung, Asan-si (KR); Chul Ho Jeong, Seoul (KR); Seung Kyun Hong, Cheonan-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/446,087

(22) Filed: Aug. 26, 2021

(65) Prior Publication Data

US 2022/0164045 A1   May 26, 2022

(30) Foreign Application Priority Data

Nov. 25, 2020 (KR) .................. 10-2020-0159950

(51) Int. Cl.
| | |
|---|---|
| *G06F 3/046* | (2006.01) |
| *C09J 183/04* | (2006.01) |
| *C09J 7/38* | (2018.01) |
| *C09J 5/06* | (2006.01) |

(52) U.S. Cl.
CPC ................ *G06F 3/046* (2013.01); *C09J 5/06* (2013.01); *C09J 7/38* (2018.01); *C09J 183/04* (2013.01); *C09J 2203/326* (2013.01); *G06F 2203/04102* (2013.01); *G06F 2203/04103* (2013.01)

(58) Field of Classification Search
CPC .......... G06F 3/046; G06F 2203/04102; G06F 2203/04103; G06F 3/0412; C09J 5/06; C09J 7/38; C09J 183/04; C09J 2203/326; C09J 2203/318; C09J 2301/416; C09J 5/00; H01L 27/323; H01L 51/5246; H01L 2251/5338

See application file for complete search history.

(56) References Cited

U.S. PATENT DOCUMENTS

| | | | | |
|---|---|---|---|---|
| 4,600,779 A | * | 7/1986 | Crenshaw ............ | C07D 417/12 514/183 |
| 4,900,779 A | * | 2/1990 | Leibfried ................ | C08L 83/14 523/222 |
| 5,124,423 A | * | 6/1992 | Leibfried ................ | C08G 77/48 528/25 |
| 11,163,205 B1 | * | 11/2021 | Li ........................ | H10K 59/131 |

(Continued)

FOREIGN PATENT DOCUMENTS

| | | |
|---|---|---|
| KR | 10-2020-0006646 | 1/2020 |
| KR | 10-2022-0019144 | 2/2022 |

*Primary Examiner* — Ibrahim A Khan
(74) *Attorney, Agent, or Firm* — F. Chau & Associates, LLC

(57) ABSTRACT

The present disclosure relates generally to a display device. According to one aspect of the present disclosure, a display device includes: a display panel configured to display an image on its front surface, a digitizer layer disposed on a back surface of the display panel and configured to generate a magnetic field by first electrode patterns and second electrode patterns, and an adhesive layer disposed between the display panel and the digitizer layer and containing $SiOCH_3CH_3—CH_2—CH_2—SiCH_3OCH_3OCH_3$.

18 Claims, 19 Drawing Sheets

(56) References Cited

U.S. PATENT DOCUMENTS

| | | | |
|---|---|---|---|
| 2007/0165004 A1* | 7/2007 | Seelhammer | G06F 3/0412 345/173 |
| 2008/0242807 A1* | 10/2008 | Aoki | C08L 83/00 525/478 |
| 2010/0134439 A1* | 6/2010 | Ito | G06F 3/0412 445/24 |
| 2010/0197821 A1* | 8/2010 | Jeong | C09J 133/08 522/69 |
| 2010/0265444 A1* | 10/2010 | Nguyen | G02F 1/133528 349/122 |
| 2011/0005662 A1* | 1/2011 | Sung | G06F 3/0446 156/153 |
| 2011/0156850 A1* | 6/2011 | Okamoto | B22F 1/102 427/127 |
| 2011/0182072 A1* | 7/2011 | Shimizu | C09K 11/7739 362/293 |
| 2013/0037748 A1* | 2/2013 | Kato | C09K 11/7794 252/301.36 |
| 2013/0069890 A1* | 3/2013 | Lee | G06F 3/0412 156/60 |
| 2013/0081751 A1* | 4/2013 | Kokaji | B32B 37/0046 156/578 |
| 2015/0068674 A1* | 3/2015 | Tsuchida | G02F 1/1333 156/60 |
| 2017/0177108 A1* | 6/2017 | Sebastian | H05K 3/28 |
| 2017/0253770 A1* | 9/2017 | Nam | C09J 133/068 |
| 2017/0317315 A1* | 11/2017 | Yang | G06F 3/0412 |
| 2018/0061909 A1* | 3/2018 | Okazaki | H10K 77/111 |
| 2018/0354227 A1* | 12/2018 | Park | B32B 5/12 |
| 2018/0375043 A1* | 12/2018 | Jung | H10K 50/8426 |
| 2019/0129553 A1* | 5/2019 | Oh | G06F 3/041 |
| 2019/0171046 A1* | 6/2019 | Shimowada | G02F 1/133528 |
| 2022/0043538 A1 | 2/2022 | Kishimoto et al. | |
| 2022/0155894 A1* | 5/2022 | Shi | G06F 3/0412 |

* cited by examiner

DISPLAY DEVICE AND METHOD OF MANUFACTURING THE SAME

CROSS-REFERENCE TO RELATED APPLICATION

This application claims priority under 35 U.S.C. § 119 to Korean Patent Application No. 10-2020-0159950 filed on Nov. 25, 2020 in the Korean Intellectual Property Office, the disclosure of which is incorporated by reference herein in its entirety.

TECHNICAL FIELD

The present disclosure relates to a display device and a method of manufacturing the same. More particularly, the present disclosure relates to a display device with increased display quality and a method of manufacturing the same.

DISCUSSION OF THE RELATED ART

With the advancement of the information-oriented society, there has been increased demand for display devices in various electronic devices. For example, display devices are employed in smartphones, digital cameras, laptop computers, navigation devices, smart televisions, and many others.

Recently, there has been demand for flexible display devices that can provide a wide display screen while also providing portability and increased space utilization. For example, bendable display devices, rollable display devices, and foldable display devices have been released.

Further, recent display devices can support touch input from a part of a user's body (e.g., a finger) and touch input using an electronic pen (e.g., a stylus pen). A touch input using the electronic pen may allow the display device to detect the touch input with increased sensitivity and accuracy than a touch input using a part of a user's body. However, a protective film disposed on a digitizer layer for detecting the touch input using the electronic pen may have an uneven shape due to different heights resulting from circuit wiring in the digitizer layer. Accordingly, when the display device is not displaying an image, and when high-intensity light is irradiated to the front surface of the display device, a user may recognize the uneven shape of the protective film due to the wirings of the digitizer layer on the front surface of the display device.

SUMMARY

Aspects of the present disclosure provide a display device capable of preventing an uneven shape of a protective film from being recognized by the user on the front surface of the display device. The uneven shape of the protective film may be caused by the stepped portion of the wirings of a digitizer layer on which the protective film is disposed, where the digitizer layer is configured to detect a touch input from an electronic pen.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

In accordance with a display device according to embodiments, the digitizer layer is adhered onto the back surface of the panel protective film using a semi-cured first adhesive layer, so that the front surface of the first adhesive layer may not have an uneven shape even if the electrode patterns of the digitizer layer have a stepped portion. Therefore, the protective film disposed on the first adhesive layer may also not have an uneven shape. Accordingly, when the display device is not displaying an image and high-intensity light is irradiated to the front surface of the display device, it is possible to prevent the uneven shape of the protective film caused by the stepped portion of the wirings of the digitizer layer from being recognized by a user on the front surface of the display device.

According to one aspect of the invention, a display device includes: a display panel configured to display an image on its front surface, a digitizer layer disposed on a back surface of the display panel and configured to generate a magnetic field by first electrode patterns and second electrode patterns and an adhesive layer disposed between the display panel and the digitizer layer and containing $SiOCH_3CH_3$—$CH_2$—$CH_2$—$SiCH_3OCH_3OCH_3$.

The adhesive layer may include a reaction retarder.

The reaction retarder may include any one of triphenylphosphine, tributylamine, tetramethylethylenediamine, benzotriazole, acetylenediol, a peroxide compound, and maleic acid.

The display device may further include a pressure sensitive adhesive layer disposed between the display panel and the adhesive layer.

The pressure sensitive adhesive layer may have a thickness of 10 μm or less.

The display panel may include a folding area, a first non-folding area disposed on one side of the folding area, and a second non-folding area disposed on the other side of the folding area, where the folding area is capable of being bent such that the first non-folding area faces the second non-folding area without damaging the display panel.

The pressure sensitive adhesive layer may include a first pressure sensitive adhesive layer overlapping the first non-folding area in a thickness direction of the display panel and a second pressure sensitive adhesive layer overlapping the second non-folding area in the thickness direction of the display panel, wherein a gap between the first pressure sensitive adhesive layer and the second pressure sensitive adhesive layer overlaps the folding area.

The gap between the first pressure sensitive adhesive layer and the second pressure sensitive adhesive layer may be less than a width of the folding area.

The display device may further include a shielding member disposed on a back surface of the digitizer layer to shield the magnetic field of the digitizer layer.

The digitizer layer may include a base layer having the first electrode patterns disposed on its top surface, and the second electrode patterns disposed on its bottom surface, and each of the first electrode patterns is elongated in a first direction, and each of the second electrode patterns is elongated in a second direction crossing the first direction.

The adhesive layer may have a storage modulus of 0.2 MPa or less at −20° C.

The adhesive layer may have a storage modulus of 2 MPa or less at −50° C.

According to one aspect of the invention, a display device includes: a display panel, a digitizer layer disposed on one surface of the display panel configured to generate a magnetic field by first electrode patterns and second electrode patterns and an adhesive layer disposed between the display panel and the digitizer layer and having a storage modulus of 0.2 MPa or less at −20° C.

According to one aspect of the invention, a method of manufacturing a display device includes the following steps:

coating an adhesive material in a liquid state on a digitizer layer, forming the adhesive material into a semi-cured adhesive layer by irradiating ultraviolet rays onto the adhesive material and adhering a protective film to the semi-cured adhesive layer, wherein a display panel is disposed on the protective film.

The adhesive material may contain vinylsilane and hydrosilane.

In the forming of the adhesive material into the semi-cured adhesive layer by irradiating the ultraviolet rays onto the adhesive material, the vinylsilane and the hydrosilane may be bonded as $SiOCH_3CH_3—CH_2—CH_2—SiCH_3CH_3OCH_3$ by the ultraviolet rays.

The adhesive material may further include a reaction retarder.

The reaction retarder may include any one of triphenylphosphine, tributylamine, tetramethylethylenediamine, benzotriazole, acetylenediol, a peroxide compound, and maleic acid.

The semi-cured adhesive layer may be maintained for 30 minutes to 1 hour by the reaction retarder.

In the adhering of the protective film to the semi-cured adhesive layer, the protective film may be adhered to the semi-cured adhesive layer using a pressure sensitive adhesive layer.

Details of other exemplary embodiments will be included in the detailed description of the invention and the accompanying drawings.

Other features and embodiments may be apparent from the following detailed description, the drawings, and the claims.

BRIEF DESCRIPTION OF THE DRAWINGS

The above and other aspects and features of the present disclosure will become more apparent by describing in detail embodiments thereof with reference to the attached drawings, in which.

DETAILED DESCRIPTION OF THE EMBODIMENTS

Figure 1:
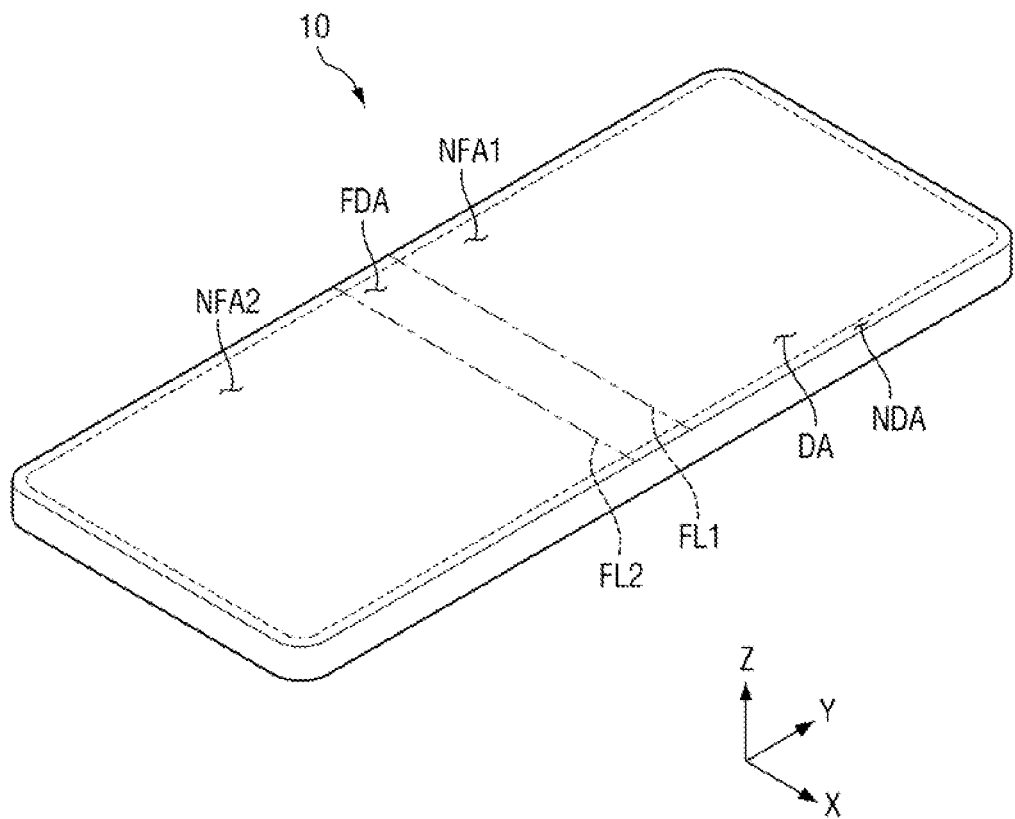
FIGS. 1 and 2 are perspective views illustrating a display device according to an embodiment.

The invention now will be described more fully hereinafter with reference to the accompanying drawings, in which various embodiments are shown. This invention may, however, be embodied in many different forms, and should not necessarily be construed as limited to the embodiments set forth herein. Rather, these embodiments are given to provide a thorough and complete disclosure, and so that the present disclosure will fully convey the scope of the invention to those skilled in the art. Like reference numerals may refer to like elements throughout.

It will be understood that when a component, such as a film, a region, a layer, or an element, is referred to as being "on", "connected to", "coupled to", or "adjacent to" another component, it can be directly on, connected, coupled, or adjacent to the other component, or intervening components may be present. It will also be understood that when a component is referred to as being "between" two components, it may be the only component between the two components, or one or more intervening components may also be present. It will also be understood that when a component is referred to as "covering" another component, it can be the only component covering the other component, or one or more intervening components may also be covering the other component. Further, the covering component may partially, substantially, or fully cover the covered component, unless otherwise explicitly indicated. Other words use to describe the relationship between elements may be interpreted in a like fashion.

It will be further understood that descriptions of features or aspects within each embodiment are available for other similar features or aspects in other embodiments, unless the context clearly indicates otherwise.

Herein, description of singular components may apply to a plurality of the same components as well, unless the context clearly indicates otherwise.

Spatially relative terms, such as "beneath", "below", "lower", "under", "above", "upper", etc., may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features may then be oriented "above" the other elements or features. Thus, the exemplary terms "below" and "under" can encompass both an orientation of above and below. In the present description, "when viewed on a plane" or "in a plan view" may be defined as being viewed from or as so viewed from a thickness direction (ex., a "Z" direction); for example, as viewed "top-down."

It will be understood that the terms "first," "second," "third," etc. are used herein to distinguish one element from another, and the elements are not limited by these terms. Thus, a "first" element in one embodiment may be described as a "second" element in another embodiment.

Herein, when two or more elements or values are described as being substantially the same as or about equal to each other, it is to be understood that the elements or values may be identical to each other, indistinguishable from each other, or distinguishable from each other but functionally the same as each other as would be understood by a person having ordinary skill in the art. Further, it is to be understood that while parameters may be described herein as having "about" a certain value, according to embodiments, the parameter may be exactly the certain value or approximately the certain value within a measurement error as would be understood by a person having ordinary skill in the art.

Hereinafter, embodiments of the present disclosure will be described in detail with reference to the accompanying drawings.

Figure 2:
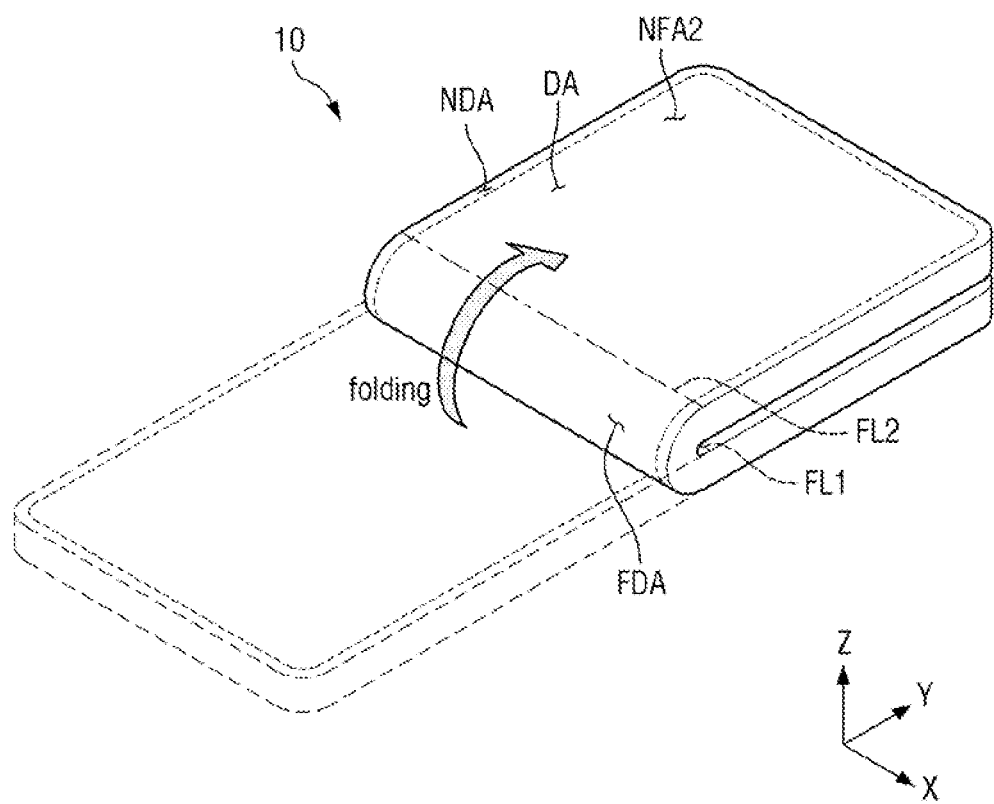

FIGS. 1 and 2 are perspective views illustrating a display device according to an embodiment. FIG. 1 is a perspective view illustrating a display device in an unfolded state according to an embodiment. FIG. 2 is a perspective view illustrating a display device in a folded state according to an embodiment.

In FIGS. 1 and 2, a first direction (ex., an X-axis direction) may be a direction parallel to a first side of the display device 10 in a plan view and may be, for example, a horizontal direction of the display device 10. A second direction (ex., a Y-axis direction) may be a direction parallel to a second side in contact with the first side of the display device 10 in a plan view and may be, for example, a vertical direction of the display device 10. The first and second directions may cross each other and span a horizontal plane. For example, the first and second directions may be perpendicular to each other. A third direction (ex., a Z-axis direction) may be a thickness direction of the display device 10.

The display device 10 may have a rectangular or square shape in a plan view. The display device 10 may have a rectangular shape with right-angled or rounded corners in a plan view. The display device 10 may include two short sides arranged in the first direction (ex., the X-axis direction) and two long sides arranged in the second direction (ex., the Y-axis direction) in a plan view.

The display device 10 includes a display area DA and a non-display area NDA. In a plan view, the shape of the display area DA may correspond to the shape of the display device 10. For example, when the display device 10 has a rectangular shape in a plan view, the display area DA may also have a rectangular shape.

The display area DA may include a plurality of pixels to display an image. The plurality of pixels may be arranged in a matrix along the first and second directions. The plurality of pixels may have a rectangular, rhombic, or square shape in a plan view, though their shape is not necessarily limited thereto. For example, the plurality of pixels may have a quadrilateral shape other than a rectangular, rhombic, or square shape, a polygonal shape other than a quadrilateral shape, a circular shape, or an elliptical shape.

The non-display area NDA may not include pixels or display an image. The non-display area NDA may be disposed around the display area DA in a plan view. The non-display area NDA may surround the display area DA as shown in FIGS. 1 and 2, but is not necessarily limited thereto. For example, the display area DA may be partially surrounded by the non-display area NDA.

The display device 10 may have a folded state and an unfolded state. As shown in FIG. 2, the display device 10 may be folded in an in-folding manner such that the display area DA is disposed on the inside of the display device 10. For example, if the display device 10 is folded in an in-folding manner, portions of the front surface of the display device 10 may face each other. Alternatively, the display device 10 may be folded in an out-folding manner such that the display area DA is disposed on the outside. When the display device 10 is folded in the out-folding manner, portions of the back surface of the display device 10 may face each other.

The display device 10 may include a folding area FDA, a first non-folding area NFA1, and a second non-folding area NFA2. The folding area FDA may be an area in which the display device 10 is folded or bent, and the first and second non-folding areas NFA1 and NFA2 may be areas in which the display device 10 is not folded or bent.

The first non-folding area NFA1 may be defined on one side (e.g., an upper side) of the folding area FDA. The second non-folding area NFA2 may be defined on the other side (e.g., a lower side) of the folding area FDA. The folding area FDA, which is bounded by a first folding line FL1 and a second folding line FL2, may be a curved area with a predetermined curvature in a folded state. The first folding line FL1 may be the boundary between the folding area FDA and the first non-folding area NFA1, and the second folding line FL2 may be the boundary between the folding area FDA and the second non-folding area NFA2.

The first folding line FL1 and the second folding line FL2 may extend in the first direction (ex., the X-axis direction) as shown in FIGS. 1 and 2. In this case, the display device 10 may be folded in the second direction (ex., the Y-axis direction). Accordingly, the length of the display device 10 in the second direction (ex., the Y-axis direction) may be reduced to approximately half, providing increased portability and allowing a user to conveniently carry the display device 10.

When the first folding line FL1 and the second folding line FL2 extend in the first direction (ex., the X-axis direction) as shown in FIGS. 1 and 2, the length of the folding area FDA in the second direction (ex., the Y-axis direction) may be shorter than the length of the folding area FDA in the first direction (ex., the X-axis direction). Further, the length of the first non-folding area NFA1 in the second direction (ex., the Y-axis direction) may be longer than the length of the first non-folding area NFA1 in the first direction (ex., the X-axis direction). The length of the second non-folding area NFA2 in the second direction (ex., the Y-axis direction) may be longer than the length of the second non-folding area NFA2 in the first direction (ex., the X-axis direction). However, the present disclosure is not necessarily limited thereto, and the non-folding areas NFA1 and NFA2 may have lengths that are substantially the same in the first and second directions (ex., the areas may be square), or may have longer lengths in the first direction than in the second direction.

Each of the display area DA and the non-display area NDA may overlap at least one of the folding area FDA, the first non-folding area NFA1, and the second non-folding area NFA2. For example, FIGS. 1 and 2 illustrate that the display area DA and the non-display area NDA each overlap the folding area FDA, the first non-folding area NFA1, and the second non-folding area NFA2.

Figure 3:
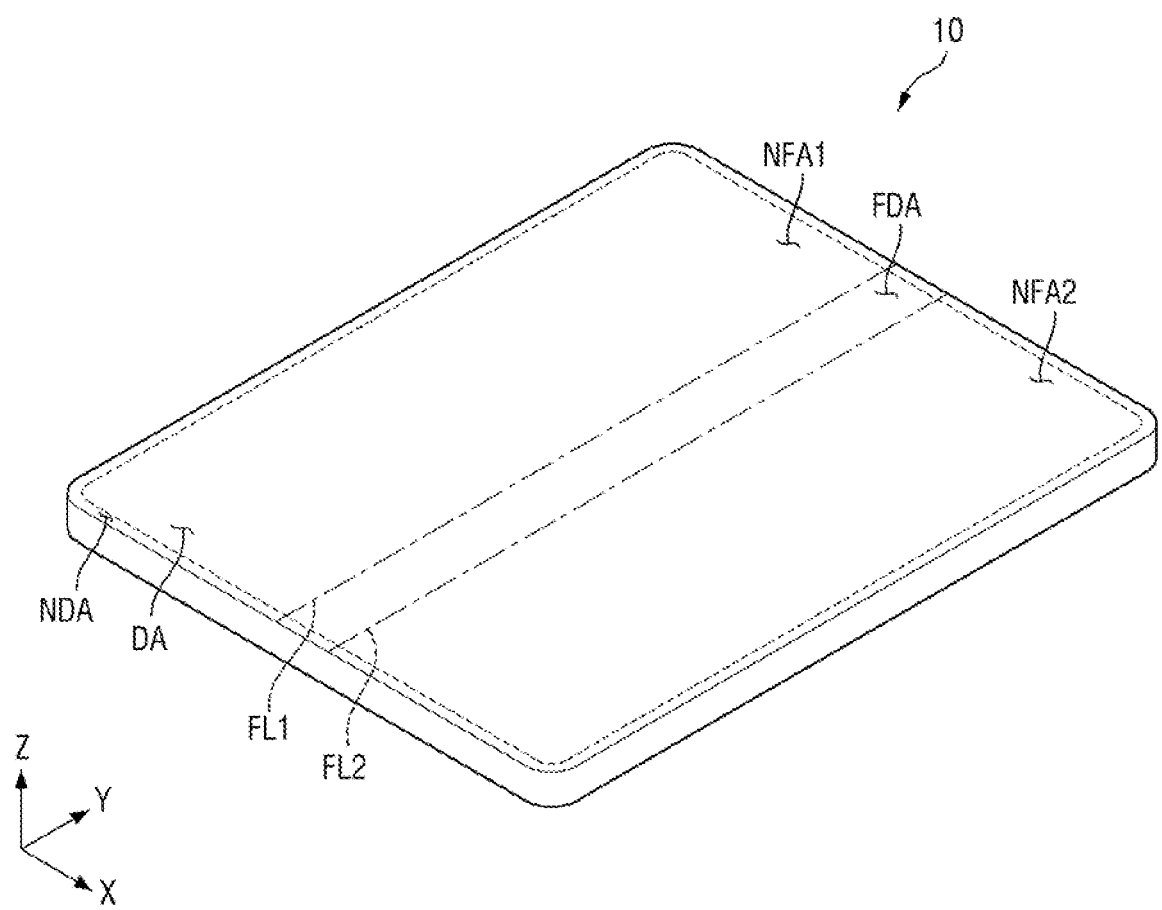
FIGS. 3 and 4 are perspective views illustrating a display device according to an embodiment.
Figure 4:
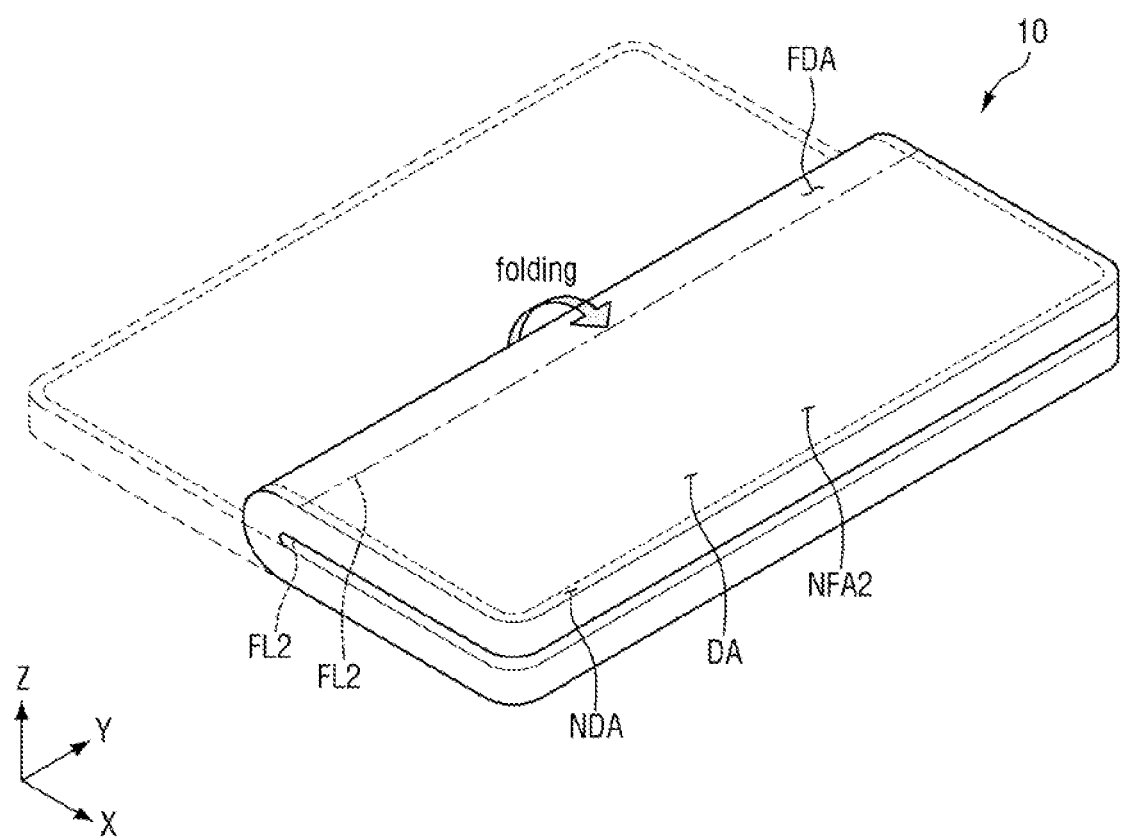

FIGS. 3 and 4 are perspective views illustrating a display device according to an embodiment. FIG. 3 is a perspective view illustrating a display device in an unfolded state according to an embodiment. FIG. 4 is a perspective view illustrating a display device in a folded state according to an embodiment.

The embodiment of FIGS. 3 and 4 is different from the embodiment of FIGS. 1 and 2 in that the first folding line FL1 and the second folding line FL2 extend in the second direction (ex., the Y-axis direction) and the display device 10 is folded in the first direction (ex., the X-axis direction). Folding the display device 10 of FIG. 2 allows the length of the display device 10 in the first direction (ex., the X-axis direction) to be reduced approximately half, providing for increased portability and allowing a user to conveniently carry the display device 10. Therefore, the description of the embodiment of FIGS. 3 and 4 will be omitted.

Figure 5:
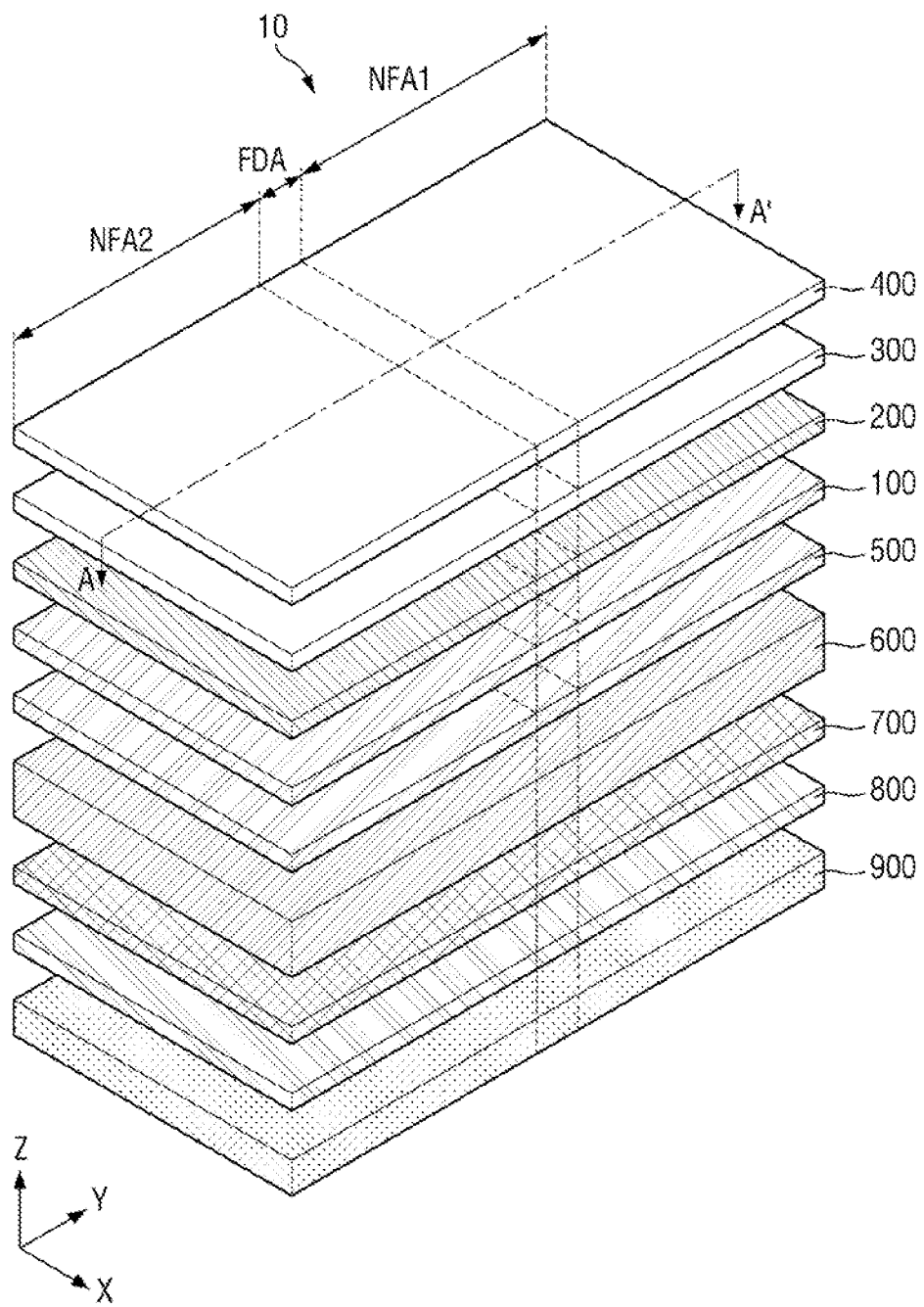
FIG. 5 is an exploded perspective view illustrating an example of the display device of FIG. 1.
Figure 6:
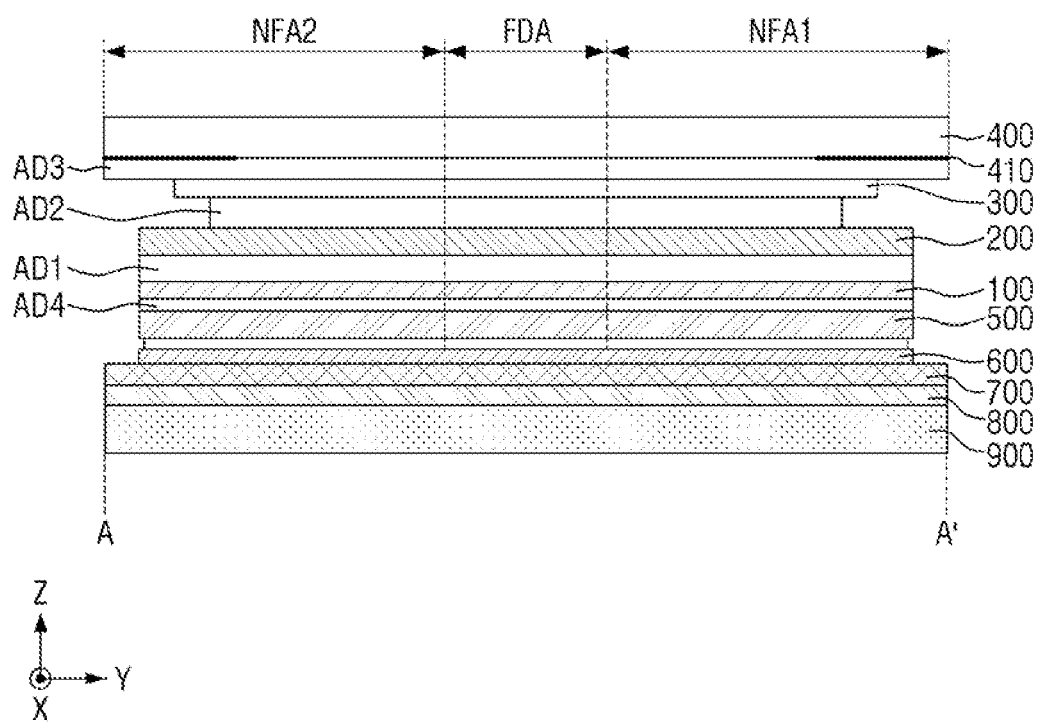
FIG. 6 is a cross-sectional view of the display device taken along line A-A' of FIG. 5.

FIG. 5 is an exploded perspective view illustrating an example of the display device of FIG. 1. FIG. 6 is a cross-sectional view of the display device taken along line A-A' of FIG. 5.

Referring to FIGS. 5 and 6, the display device 10 according to an embodiment includes a display panel 100, a polarizing film 200, a window 300, a window protective film 400, a panel protective film 500, a first adhesive layer 600, a digitizer layer 700, a shielding member 800, and a heat dissipation member 900.

The display panel may be an organic light emitting display panel using an organic light emitting diode, a quantum dot light emitting display panel including a quantum dot light emitting layer, an inorganic light emitting display panel including an inorganic semiconductor, or a micro light emitting display panel using a micro light emitting diode (LED). The following description applies to embodiments where the display panel 100 is an organic light emitting display panel, but the present disclosure is not necessarily limited thereto. The display panel 100 will be described in detail later with reference to FIG. 7.

The polarizing film 200 may be disposed on the front surface of the display panel 100. The front surface of the display panel 100 may be a display surface on which an image is displayed. The polarizing film 200 may be adhered to the front surface of the display panel 100 by a first adhesive member AD1. The first adhesive member AD1 may be or include, for example, an optically clear adhesive (OCA) film or an optically clear resin (OCR). The polarizing film 200 may include a phase retardation film such as a linear polarizer plate and/or a quarter-wave (λ/4) plate.

The window 300 may be disposed on the front surface of the polarizing film 200. The window 300 may be adhered to the front surface of the polarizing film 200 by a second adhesive member AD2. The second adhesive member AD2 may be or include, for example, an optically clear adhesive film or an optically clear resin. The window 300 may be made of a transparent material and may contain, e.g., glass or plastic. For example, the window 300 may be, but not necessarily, an ultra thin glass (UTG) with a thickness of 0.1 mm or less or a transparent polyimide film.

The window protective film 400 may be disposed on the front surface of the window 300. The window protective film 400 may be adhered to the front surface of the window 300 by a third adhesive member AD3. The third adhesive member AD3 may be, for example an optically clear adhesive film or an optically clear resin. The window protective film 400 may perform at least one of the following functions: scattering prevention, impact absorption, scratch prevention, fingerprint smudge protection, and glare prevention on the window 300.

A light blocking layer 410 may be disposed on the back surface of the window protective film 400. The light blocking layer 410 may be disposed on the edge of the window protective film 400. The light blocking layer 410 may include a light blocking material capable of blocking visible light. For example, the light blocking layer 410 may contain an organic black pigment or an inorganic black pigment such as carbon black or the like.

The panel protective film 500 may be disposed on the back surface of the display panel 100. The panel protective film 500 may be adhered to the back surface of the display panel 100 by a fourth adhesive member AD4. The fourth adhesive member AD4 may be or include a pressure sensitive adhesive (PSA). The panel protective film 500 may support the display panel 100 and protect the back surface of the display panel 100. For example, the panel protective film 500 may prevent cracks or other structural damage to the display panel 100. The panel protective film 500 may be a glass or a plastic film such as polyethylene terephthalate (PET).

Although it is illustrated in FIGS. 5 and 6 that the panel protective film 500 is disposed in the folding area FDA, the present disclosure is not necessarily limited thereto. For example, the protective film 500 may be removed from the folding area FDA to facilitate smooth folding of display device 10.

The first adhesive layer 600 may be disposed between the panel protective film 500 and the digitizer layer 700. The first adhesive layer 600 may be adhered to the digitizer layer 700 and the panel protective film 500 by a UV curing step. For example, the first adhesive layer 600 may be coated on the digitizer layer 700 in a liquid state and semi-cured by the irradiation of ultraviolet rays (UV). Then, the panel protective film 500 may be adhered to the semi-cured first adhesive layer 600. The first adhesive layer 600 and a method of adhering the digitizer layer 700 and the panel protective film 500 using the first adhesive layer 600 will be described later with reference to FIGS. 9 and 15 to 18.

The digitizer layer 700 may be disposed on the back surface of the panel protective film 500. The digitizer layer 700 may be adhered onto the back surface of the panel protective film 500 by the first adhesive layer 600.

The digitizer layer 700 may include electrode patterns configured to detect access or contact of an electronic pen such as a stylus pen that supports electromagnetic resonance (EMR). The digitizer layer 700 may detect the magnetic field or the electromagnetic signal emitted from the electronic pen based on the electrode patterns, and determine the point where the detected magnetic field or the electromagnetic signal is strongest as touch coordinates. For example, the magnetic field or the electromagnetic signal may be the strongest at a location where contact is made between the stylus pen and the display panel. The digitizer layer 700 will be described later with reference to FIGS. 8 and 9.

The shielding member 800 may be disposed on the back surface of the digitizer layer 700. The shielding member 800 contains a magnetic metal powder, and thus may allow a magnetic field or the electromagnetic signal that has passed through the digitizer layer 700 to flow into the shielding member 800. Therefore, the shielding member 800 may suppress the emission of the magnetic field or the electromagnetic signal to the back surface of the display device 10.

The heat dissipation member 900 may be disposed on the back surface of the shielding member 800. The heat dissipation member 900 may be and/or include a metal film having excellent thermal conductivity, such as a copper alloy, copper, nickel, ferrite, silver, or the like. Accordingly, heat generated by the display device 10 may be released to the outside by the heat dissipation member 900.

Figure 7:
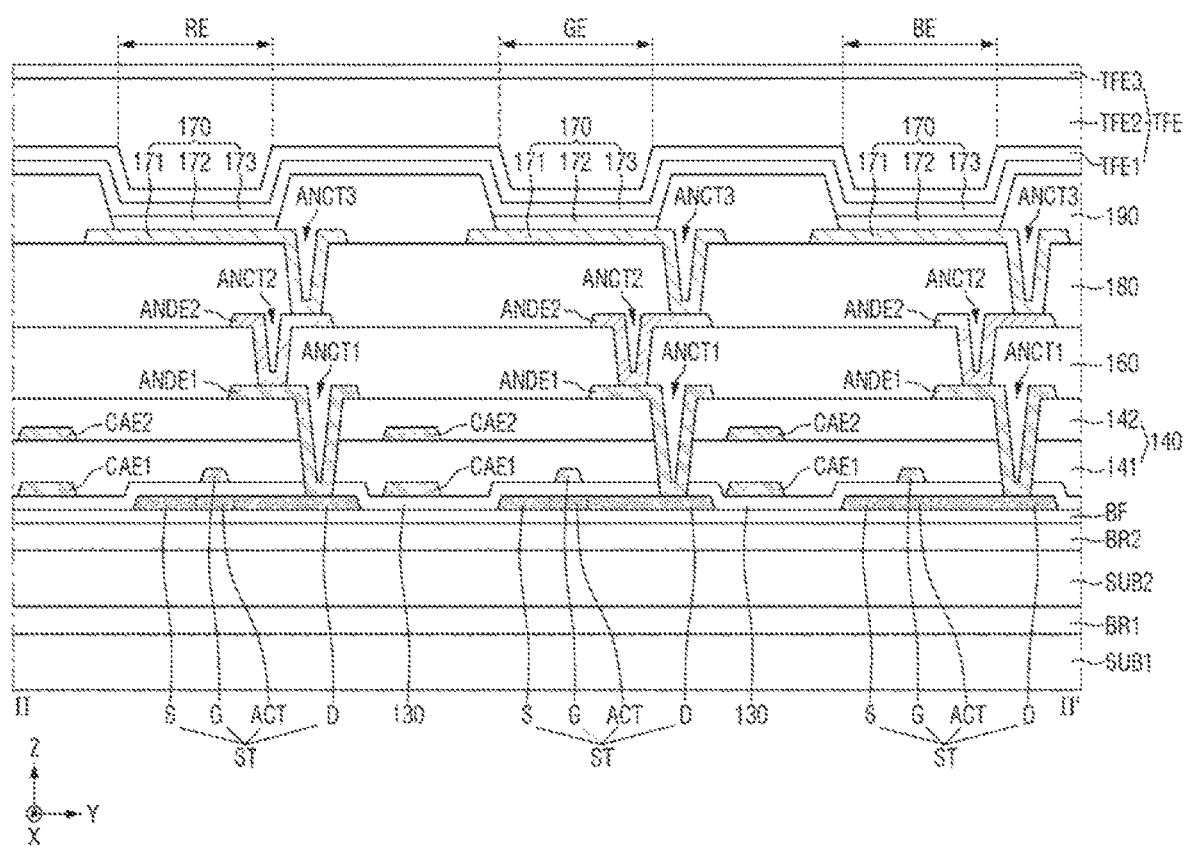
FIG. 7 is a cross-sectional view of the display panel of FIG. 6.

FIG. 7 is a cross-sectional view of the display panel of FIG. 6. FIG. 7 shows an example of a cross section of the display area of the display panel.

Referring to FIG. 7, a first barrier layer BR1 may be disposed on a first substrate SUB1, a second substrate SUB2 may be disposed on the first barrier layer BR1, and a second barrier layer BR2 may be disposed on the second substrate SUB2.

The first substrate SUB1 and the second substrate SUB2 may each be made of an insulating material such as polymer resin or the like. For example, the first substrate SUB1 and the second substrate SUB2 may be made of polyimide. The first substrate SUB1 and the second substrate SUB2 may each be a flexible substrate which can be bent, folded and rolled without being damaged.

The first and second substrates SUB1 and SUB2 may be susceptible to moister permeation. The first barrier layer BR1 and the second barrier layer BR2 may protect the thin film transistors of a thin film transistor layer TFTL and a light emitting layer 172 of a light emitting element layer EML from moisture permeating through the first substrate SUB1 and the second substrate SUB2. Each of the first barrier layer BR1 and the second barrier layer BR2 may be include a plurality of inorganic layers that are alternately stacked. For example, each of the first barrier layer BR1 and the second barrier layer BR2 may be include multiple layers in which one or more inorganic layers of a silicon nitride layer, a silicon oxynitride layer, a silicon oxide layer, a titanium oxide layer and an aluminum oxide layer are alternately stacked.

A buffer layer BF may be disposed on the second barrier layer BR2. The buffer layer BF may include at least one inorganic layer. For example, the buffer layer BF may include one or more inorganic layers of a silicon nitride layer, a silicon oxynitride layer, a silicon oxide layer, a titanium oxide layer and an aluminum oxide layer.

A thin film transistor ST may be disposed on the buffer layer BF. The thin film transistor ST may include an active layer ACT, a gate electrode G, a source electrode S, and a drain electrode D.

The active layer ACT, the source electrode S, and the drain electrode D may be disposed on the buffer layer BF. The active layer ACT may include polycrystalline silicon, monocrystalline silicon, low-temperature polycrystalline silicon, amorphous silicon, or an oxide semiconductor. The source electrode S and the drain electrode D may have electrical conductivity by being formed from a silicon semiconductor or an oxide semiconductor doped with ions or impurities. The active layer ACT may overlap the gate electrode G in the third direction (ex., the Z-axis direction), and the source electrode S and the drain electrode D may not overlap the gate electrode G in the third direction (ex., the Z-axis direction).

The gate insulating layer 130 may be disposed on the active layer ACT, the source electrode S, and the drain electrode D of the thin film transistor ST. The gate insulating layer 130 may include an inorganic layer, for example, a silicon nitride layer, a silicon oxynitride layer, a silicon oxide layer, a titanium oxide layer, or an aluminum oxide layer.

A gate electrode G and a first capacitor electrode CAE1 may be disposed on the gate insulating layer 130. The gate electrode G may overlap the active layer ACT in the third direction (ex., the Z-axis direction). The first capacitor electrode CAE1 may overlap a second capacitor electrode CAE2 in the third direction (ex., the Z-axis direction). The gate electrode G and the first capacitor electrode CAE1 may be formed as a single layer or formed as multiple layers which include any one of molybdenum (Mo), aluminum (Al), chromium (Cr), gold (Au), titanium (Ti), nickel (Ni), neodymium (Nd) and copper (Cu) or an alloy thereof.

The first interlayer insulating layer 141 may be disposed on the gate electrode G and the first capacitor electrode CAE1. The first interlayer insulating layer 141 may include an inorganic layer, for example, a silicon nitride layer, a silicon oxynitride layer, a silicon oxide layer, a titanium oxide layer, or an aluminum oxide layer. The first interlayer insulating layer 141 may include a plurality of inorganic layers.

The second capacitor electrode CAE2 may be disposed on the first interlayer insulating layer 141. The second capacitor electrode CAE2 may overlap the first capacitor electrode CAE1 in the third direction (ex., the Z-axis direction). The first interlayer insulating layer 141 may have a predetermined dielectric constant, and as a result, a capacitor may be formed by the first capacitor electrode CAE1, the second capacitor electrode CAE2, and the first interlayer insulating layer 141 disposed therebetween. The second capacitor electrode CAE2 may be formed as a single layer or multiple layers including any one of molybdenum (Mo), aluminum (Al), chromium (Cr), gold (Au), titanium (Ti), nickel (Ni), neodymium (Nd) and copper (Cu) or an alloy thereof.

A second interlayer insulating layer 142 may be disposed on the second capacitor electrode CAE2. The second interlayer insulating layer 142 may include an inorganic layer, for example, a silicon nitride layer, a silicon oxynitride layer, a silicon oxide layer, a titanium oxide layer, or an aluminum oxide layer. The second interlayer insulating layer 142 may include a plurality of inorganic layers.

The first anode connection electrode ANDE1 may be disposed on the second interlayer insulating layer 142. The first anode connection electrode ANDE1 may be connected to the drain electrode D via a first anode contact hole ANCT1 which penetrates the first and second interlayer insulating layers 141 and 142 to expose the drain electrode D. The first anode connection electrode ANDE1 may partially overlap the thin film transistor ST in the thickness direction. The first anode connection electrode ANDE1 may be formed as a single layer or multiple layers including any one of molybdenum (Mo), aluminum (Al), chromium (Cr), gold (Au), titanium (Ti), nickel (Ni), neodymium (Nd) and copper (Cu) or an alloy thereof.

The first organic layer 160 may provide planarization, and may be disposed on the first anode connection electrode ANDE1. The first organic layer 160 may include an organic layer such as acryl resin, epoxy resin, phenolic resin, polyamide resin, polyimide resin and the like.

The second anode connection electrode ANDE2 may be disposed on the first organic layer 160. The second anode connection electrode ANDE2 may be connected to the first anode connection electrode ANDE1 via the second anode contact hole ANCT2 which penetrates the first organic layer 160 to expose the first anode connection electrode ANDE1. The second connection electrode ANDE2 may partially overlap the first connection electrode ANDE1 in the thickness direction. The second anode connection electrode ANDE2 may be formed as a single layer or multiple layers made of any one of molybdenum (Mo), aluminum (Al), chromium (Cr), gold (Au), titanium (Ti), nickel (Ni), neodymium (Nd) and copper (Cu) or an alloy thereof.

A second organic layer 180 may be disposed on the second anode connection electrode ANDE2. The second organic layer 180 may include an organic layer such as acryl resin, epoxy resin, phenolic resin, polyamide resin, polyimide resin and the like.

Although FIG. 7 illustrates that the thin film transistor ST is formed by a top gate method in which the gate electrode G is located above the active layer ACT, the present disclosure is not necessarily limited thereto. For example, the thin film transistor ST may be formed by a bottom gate method in which the gate electrode G is located below the active layer ACT, or a double gate method in which the gate electrode G is located both above and below the active layer ACT. For example, the implementation of the thin film transistor may vary across embodiments of the present disclosure in accordance with different fabrication processes or display panel types.

The light emitting elements 170 and a bank 190 may be disposed on the second organic layer 180. Each of the light emitting elements 170 may include a first light emitting electrode 171, the light emitting layer 172, and a second light emitting electrode 173.

The first light emitting electrode 171 may be formed on the second organic layer 180. The first light emitting electrode 171 may penetrate through the second organic layer 180 and be connected to the second anode connection electrode ANDE2 via a third anode contact hole ANCT3 which exposes the second anode connection electrode ANDE2.

In a top emission structure in which light is emitted toward the second light emitting electrode 173 from the light emitting layer 172 and the first light emitting electrode 171, the first light emitting electrode 171 may include a metal material having high reflectivity, such as a stacked structure (Ti/Al/Ti) of aluminum and titanium, a stacked structure (ITO/Al/ITO) of aluminum and ITO, an APC alloy, and a stacked structure (ITO/APC/ITO) of an APC alloy and ITO. The APC alloy is an alloy of silver (Ag), palladium (Pd) and copper (Cu).

The bank 190 may be formed on the second organic layer 180 to partition the first light emitting electrode 171, thereby defining emission areas RE, GE, and BE. The bank 190 may cover one or more edge portions of the first light emitting electrode 171. The bank 190 may include an organic layer such as acryl resin, epoxy resin, phenolic resin, polyamide resin, polyimide resin and the like.

Each of the emission areas RE, GE, and BE corresponds to an area in which the first light emitting electrode 171, the light emitting layer 172, and the second light emitting electrode 173 are sequentially stacked, and where holes from the first light emitting electrode 171 and electrons from the second light emitting electrode 173 are combined with each other in the light emitting layer 172 to emit light.

The light emitting layer 172 is formed on the first light emitting electrode 171 and the bank 190. The light emitting layer 172 may include an organic material which emits light in a predetermined color. For example, the light emitting layer 172 may include a hole transporting layer, an organic material layer, and an electron transporting layer.

The second light emitting electrode 173 is formed on the light emitting layer 172. The second light emitting electrode 173 may cover the light emitting layer 172. The second light emitting electrode 173 may be commonly formed in the emission areas RE, GE, and BE. A capping layer may be formed on the second light emitting electrode 173.

In the top emission type structure, the second light emitting electrode 173 may include a transparent conductive material (TCO) such as ITO or IZO capable of transmitting visible light or a semi-transmissive conductive material such as magnesium (Mg), silver (Ag), or an alloy of magnesium (Mg) and silver (Ag). When the second light emitting electrode 173 is formed of a semi-transmissive conductive material, the light emission efficiency may be increased due to a micro-cavity effect.

An encapsulation layer TFE may be disposed on the second light emitting electrode 173. The encapsulation layer TFE may include at least one inorganic layer to prevent oxygen or moisture from permeating into the light emitting element layer EML. In addition, the encapsulation layer TFE may include at least one organic layer to protect the light emitting element layer EML from foreign substances such as dust. For example, the encapsulation layer TFE may include a first inorganic layer TFE1, an organic layer TFE2, and a second inorganic layer TFE3.

The first inorganic layer TFE1, the organic layer TFE2 and the second inorganic layer TFE3 may be disposed on the second light emitting electrode 173. For example, the first inorganic layer TFE1 may be directly disposed on the second light emitting electrode 173, the organic layer TFE2 may be directly disposed on the first inorganic layer TFE1, and the second inorganic layer TFE3 may be directly disposed on the organic layer TFE2. The first inorganic layer TFE1 and the second inorganic layer TFE3 may include multiple layers in which one or more inorganic layers of a silicon nitride layer, a silicon oxynitride layer, a silicon oxide layer, a titanium oxide layer and an aluminum oxide layer are alternately stacked. The organic layer TFE2 may include an organic layer such as acryl resin, epoxy resin, phenolic resin, polyamide resin, polyimide resin or the like.

Figure 8:
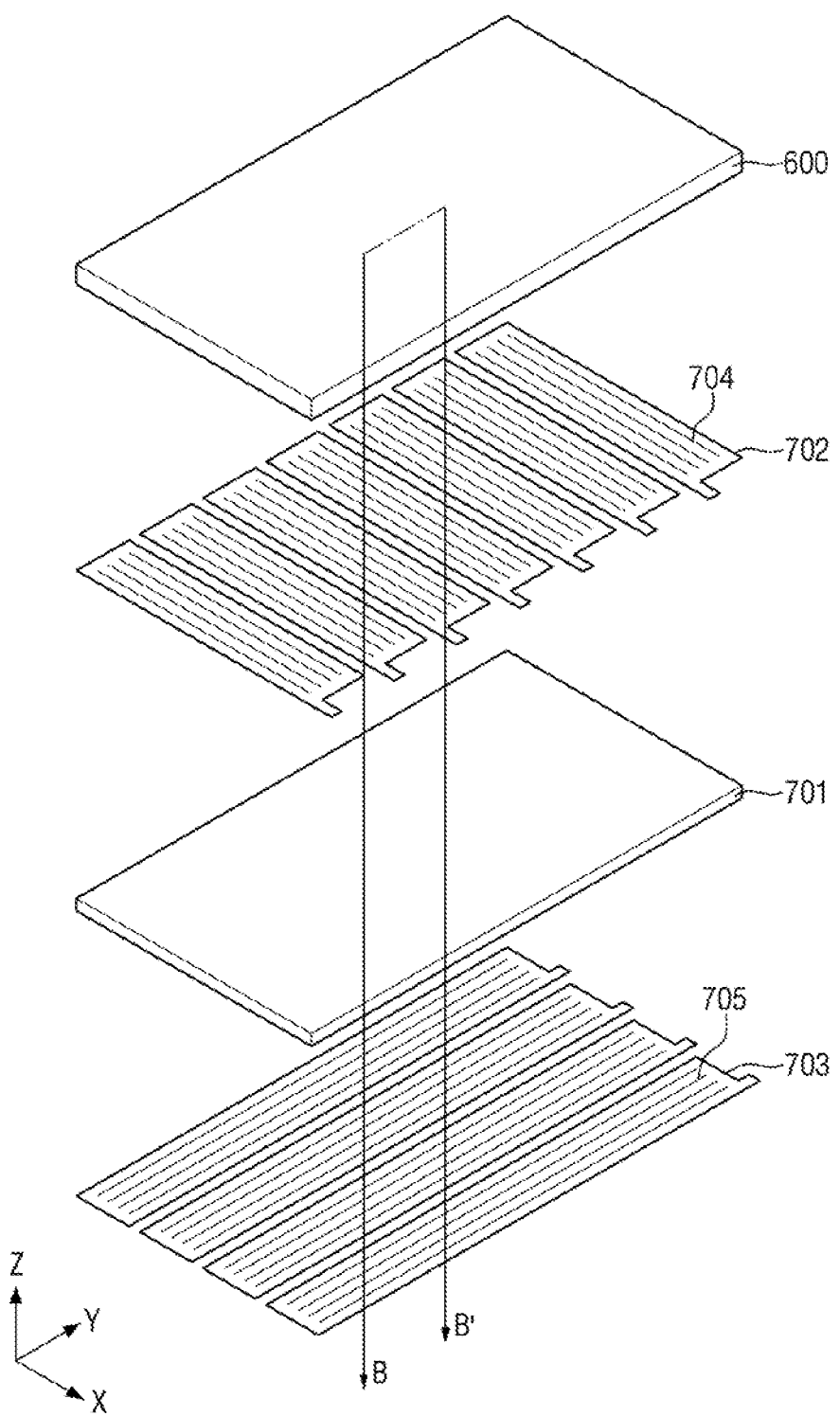
FIG. 8 is an exploded perspective view of a first adhesive layer and a digitizer layer from the display device of FIG. 6.
Figure 9:
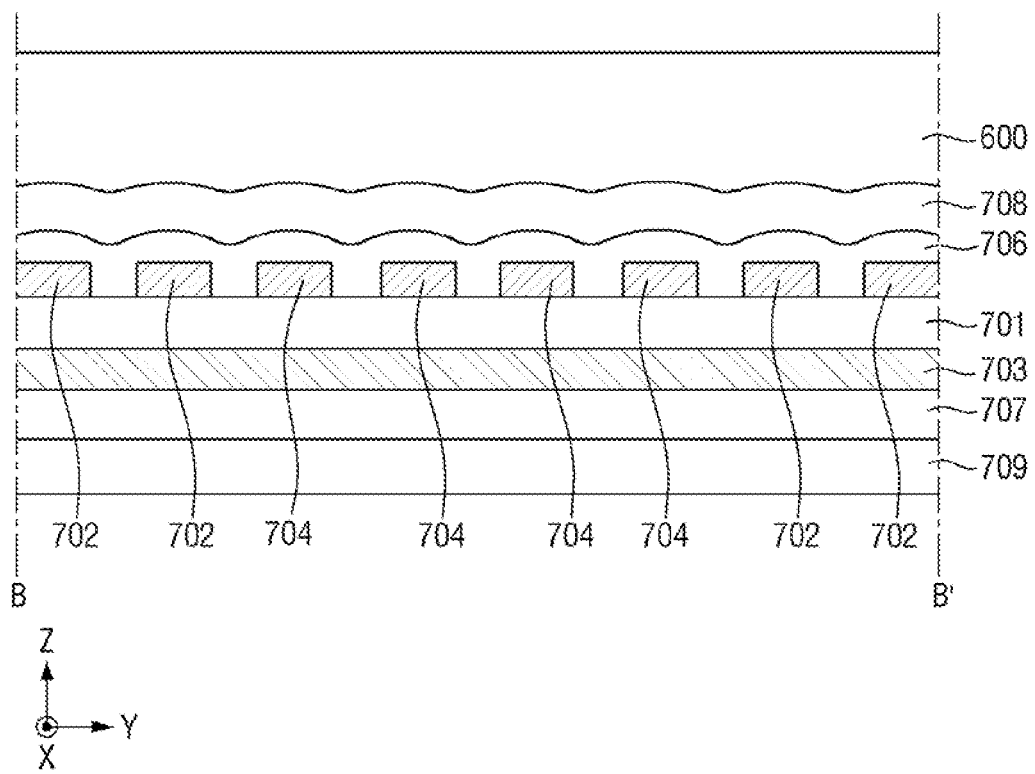
FIG. 9 is a cross-sectional view taken along line B-B' of FIG. 8.

FIG. 8 is an exploded perspective view of an adhesive layer and a digitizer layer of FIG. 6. FIG. 9 is a cross-sectional view taken along line B-B' of FIG. 8.

Referring to FIGS. 8 and 9, the digitizer layer 700 according to an embodiment may include a base layer 701, first electrode patterns 702, second electrode patterns 703, first dummy patterns 704, second dummy patterns 705, a second adhesive layer 706, a third adhesive layer 707, a first cover layer 708, and a second cover layer 709.

The base layer 701 may have flexibility and may include an insulating material. For example, the base layer 701 may include polyimide.

The first electrode patterns 702 and the first dummy patterns 704 may be disposed on the front surface of the base layer 701. The second electrode patterns 703 and the second dummy patterns 705 may be disposed on the other surface of the base layer 701.

Each of the first electrode patterns 702 may extend along the first direction (ex., the X-axis direction). The first electrode patterns 702 may be arranged along the second direction (ex., the Y-axis direction). Each of the first electrode patterns 702 may have a loop structure in a plan view.

Each of the second electrode patterns 703 may extend along the second direction (ex., the Y-axis direction). The second electrode patterns 703 may be arranged along the first direction (ex., the X-axis direction). Each of the second electrode patterns 703 may have a loop structure in a plan view.

Each of the first electrode patterns 702 and each of the second electrode patterns 703 may intersect each other. Accordingly, the magnetic field or the electromagnetic signal emitted from the electronic pen may be absorbed by the first electrode patterns 702 and the second electrode patterns 703, thereby allowing the display device to determine an access position of the electronic pen with respect to the digitizer layer 700.

Alternatively, the first electrode patterns 702 and the second electrode patterns 703 may generate a magnetic field by an input current, and the generated magnetic field or the generated electromagnetic signal may be absorbed by the electronic pen. The electronic pen may emit the absorbed magnetic field again, and the magnetic field emitted by the electronic pen may be absorbed by the first electrode patterns 702 and the second electrode patterns 703. The first electrode patterns 702 and the second electrode patterns 703 may convert the magnetic field or the electromagnetic signal output from the electronic pen into an electric signal.

Each of the first dummy patterns 704 may extend in the first direction (ex., the X-axis direction). The first dummy patterns 704 may be arranged in the second direction (ex., the Y-axis direction). The gap between the first dummy patterns 704 and the first electrode pattern 702 may be constant on all lateral sides of the first dummy patterns 704.

Each of the second dummy patterns 705 may extend in the second direction (ex., the Y-axis direction). The second dummy patterns 705 may be arranged in the first direction (ex., the X-axis direction). The gap between the second dummy patterns 705 and the second electrode pattern 703 may be constant on all lateral sides of the second dummy patterns 705.

The first electrode patterns 702, the first dummy patterns 704, the second electrode patterns 703, and the second dummy patterns 705 may contain a metal material such as copper (Cu), silver (Ag), Nickel (Ni), Tungsten (W), or the like.

The second adhesive layer 706 may be disposed on the base layer 701, the first electrode patterns 702, and the first dummy patterns 704. The first cover layer 708 may be disposed on the second adhesive layer 706. The first cover layer 708 may be adhered to the base layer 701 by the second adhesive layer 706. The second adhesive layer 706 may be and/or include a pressure sensitive adhesive. The first cover layer 708 may have flexibility and may include an insulating material. For example, the first cover layer 708 may be polyimide.

The third adhesive layer 707 may be disposed on the base layer 701, the second electrode patterns 703, and on the second dummy patterns 705. The second cover layer 709 may be disposed on the third adhesive layer 707. The second cover layer 709 may be adhered to the base layer 701 by the third adhesive layer 707. The third adhesive layer 707 may be and/or include a pressure sensitive adhesive. The second cover layer 709 may have flexibility and may include an insulating material. For example, the first cover layer 709 may be polyimide.

The first adhesive layer 600 according to an embodiment of FIGS. 8 to 9 may be disposed on the first electrode patterns 702 and the first dummy patterns 704 of the digitizer layer 700 as shown in FIG. 8. The first adhesive layer 600 may be disposed on the first cover layer 708 of the digitizer layer 700 as shown in FIG. 9.

The first adhesive layer 600 may be coated on the digitizer layer 700 in a liquid solution state. The first adhesive layer 600 may be coated in a liquid solution state by various methods such as an inkjet printing method, an inkjet injection method, a slot die coating method, a slot die printing method, and the like.

Since the first adhesive layer 600 is coated in a liquid solution state on the digitizer layer 700, the front surface of the first adhesive layer 600 may become flat after a predetermined period of time elapses. The predetermined period of time may be about 1 to 5 minutes. Accordingly, even if the electrode patterns of the digitizer layer 700 have a stepped portion, e.g., portions with uneven thicknesses, the first adhesive layer 600 may not have an uneven shape. Accordingly, the panel protective film 500 disposed on the first adhesive layer 600 may also not have an uneven shape. Accordingly, when the display device 10 according to the present disclosure is not displaying an image and high-intensity light is irradiated to the front surface of the display device 10, it is possible to prevent the uneven shape of the panel protective film 500 caused by the stepped portion of the wirings of the digitizer layer 700. As the panel protective film 500 may have an even shape, a user may not recognize an irregular surface on the front surface of the display device.

Accordingly, the display device according to the present inventive concepts may have increased display quality.

After the predetermined period of time elapses from the coating of the first adhesive layer 600 in a liquid solution state, the first adhesive layer 600 may be semi-cured by the irradiation of ultraviolet rays (UV) and adhered to the first cover layer 708 of the digitizer layer 700.

Figure 10:
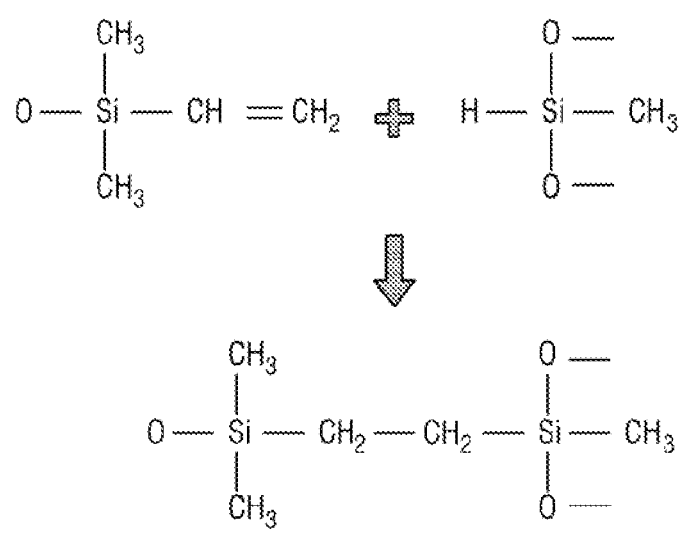
FIG. 10 show an example reaction in first adhesive layer when UV radiation is applied.

The first adhesive layer 600 may contain vinylsilane, hydrosilane, and a reaction retarder. When ultraviolet rays (UV) are irradiated onto the first adhesive layer 600, vinylsilane and hydrosilane may be bonded as $SiOCH_3CH_3$—$CH_2$—$CH_2$—$SiCH_3OCH_3OCH_3$ as shown in FIG. 10. For example, under the application of UV light, a H of hydrosilane may transfer to the $CH=CH_2$ of vinylsilane, thereby bonding the two compounds. Accordingly, the adhesive layer 600 may be cured.

The reaction retarder serves to suppress $SiOCH_3CH_3$—$CH_3$—$CH_2$—$SiCH_3OCH_3OCH_3$ bonding between vinylsilane and hydrosilane. For example, the reaction retarder may include at least one of triphenylphosphine, tributylamine, tetramethylethylenediamine, benzotriazole, acetylenediol, a peroxide compound, or maleic acid.

Since the first adhesive layer 600 contains the reaction retarder, for the first adhesive 600 may remain in a semi-cured state about 30 minutes to 1 hour after the irradiation of ultraviolet rays. The first adhesive layer 600 may maintain an adhesive strength in a semi-cured state. Therefore, the semi-cured first adhesive layer 600 may adhere the digitizer layer 700 onto the back surface of the panel protective film 500.

As described above, the first adhesive layer 600 may be disposed in a semi-cured state on the back surface of the panel protective film 500. For example, even if ultraviolet rays are irradiated before the panel protective film 500 is disposed on the front surface of the first adhesive layer 600, the first adhesive layer 600 may remain not completely cured due to the reaction retarder. In other words, the first adhesive layer 600 is semi-cured.

When the first adhesive layer 600 is made of silicon resin containing $SiOCH_3CH_3$—$CH_2$—$CH_2$—$SiCH_3OCH_3OCH_3$, the storage modulus of the first adhesive layer 600 may be low when maintained at a relatively low temperature of −20° C. to −50° C. The first adhesive layer 600 may have a lower storage modulus at a relatively low temperature of −20° C. to −50° C. as a result of the vinylsilane and hydrosilane bonding to $SiOCH_3CH_3$—$CH_2$—$CH_2$—$SiCH_3OCH_3OCH_3$ from the irradiation of ultraviolet rays. The storage modulus means an elastic component of a material in which strain energy is stored as stress.

The first adhesive layer 600 may have a storage modulus of 0.2 MPa or less at −20° C. The first adhesive layer 600 may have a storage modulus of 0.5 MPa or less at −50° C. Accordingly, the first adhesive layer 600 may maintain a low storage modulus even at a relatively low temperature of −20° C. to −50° C. and may be easily bent at −20° C. to −50° C. When the storage modulus of the first adhesive layer 600 exceeds 0.2 MPa at −20° C. or 0.5 MPa at −50° C., the display device 10 may not be easily bent.

Figure 11:
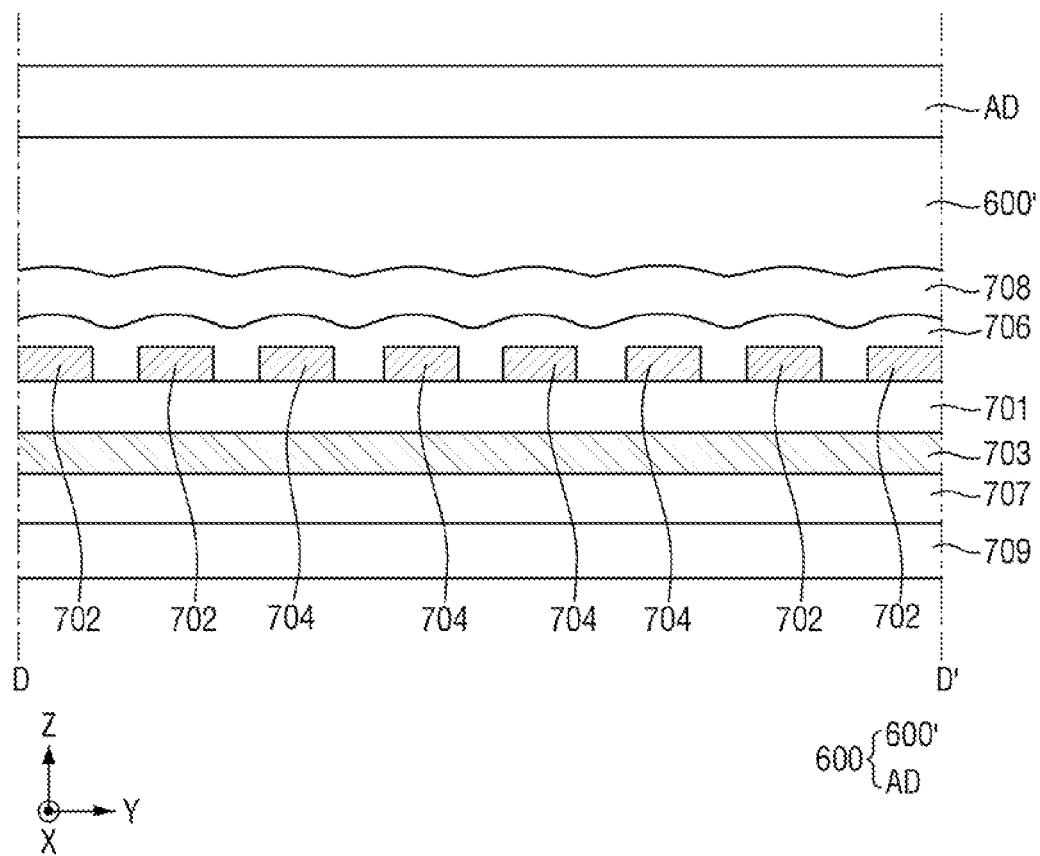
FIG. 11 is a cross-sectional view of the first adhesive layer taken along B-B' of FIG. 8.

The thickness of the first adhesive layer 600 may be 10 µm to 50 µm. When the thickness of the first adhesive layer 600 is 10 µm or less, an uneven height may be generated on the front surface of the first adhesive layer 600 due to the wiring of the digitizer layer 700. However, when the thickness of the first adhesive layer 600 is 50 Pin or more, despite minimizing unevenness on the surface, the display device 10 including the first adhesive layer 600 may not be easily bent.

device 10 may be reduced, and the display device 10 may be more easily bent than the embodiment of FIG. 11.

Table 1 shows the test results obtained by manufacturing the display devices 10 according to first and second embodiments and first and second comparative examples of this specification. The test results in Table 1 are merely examples to facilitate understanding of this specification, and the scope of the present disclosure is not limited thereto.

TABLE 1

|  | First embodiment | Second embodiment | First comparative example | Second comparative example |
| --- | --- | --- | --- | --- |
| Storage modulus at −20° C. | 0.1 MPa | 0.1 MPa | 2 MPa | 2 Mpa |
| Storage modulus at −50° C. | 0.4 MPa | 0.4 MPa | 50 Mpa | 38 Mpa |
| Recognition of wiring | Not recognized | Not recognized | Recognized | Not recognized |
| Surface quality | 0.3 | 0.3 | 1.8 | 0.5 |
| Frequency of folding | 400,000 times | 400,000 times | 200,000 times | 200,000 times |

FIG. 11 is a cross-sectional view showing another example of the first adhesive layer taken along B-B' of FIG. 8.

Referring to FIG. 11, the display device 10 is different from the embodiment of FIG. 9 in that it may include a first adhesive layer 600' and an adhesive auxiliary member AD. In the description of this embodiment with reference to FIG. 11, the differences from the embodiment of FIG. 9 will be mainly described.

Since the description of the first adhesive layer 600' is substantially the same as described with reference to FIGS. 9 and 10, the differences from the embodiment of FIG. 9 will be mainly described in FIG. 11.

The adhesive auxiliary member AD may be disposed on the front surface of the first adhesive layer 600' to improve the adhesive strength of the first adhesive layer 600. Therefore, the digitizer layer 700 may be adhered onto the back surface of the panel protective film 500 even after the first adhesive layer 600' is completely cured by the irradiation of ultraviolet rays. Accordingly, the first adhesive layer 600 may not contain a reaction retarder, and a time of the manufacturing process of the display device 10 may be decreased.

The adhesive auxiliary member AD may be a pressure sensitive adhesive. The thickness of the adhesive auxiliary member AD may be 10 µm or less. When the thickness of the adhesive auxiliary member AD exceeds 10 µm, the display device 10 may not be easily bent.

Figure 12:
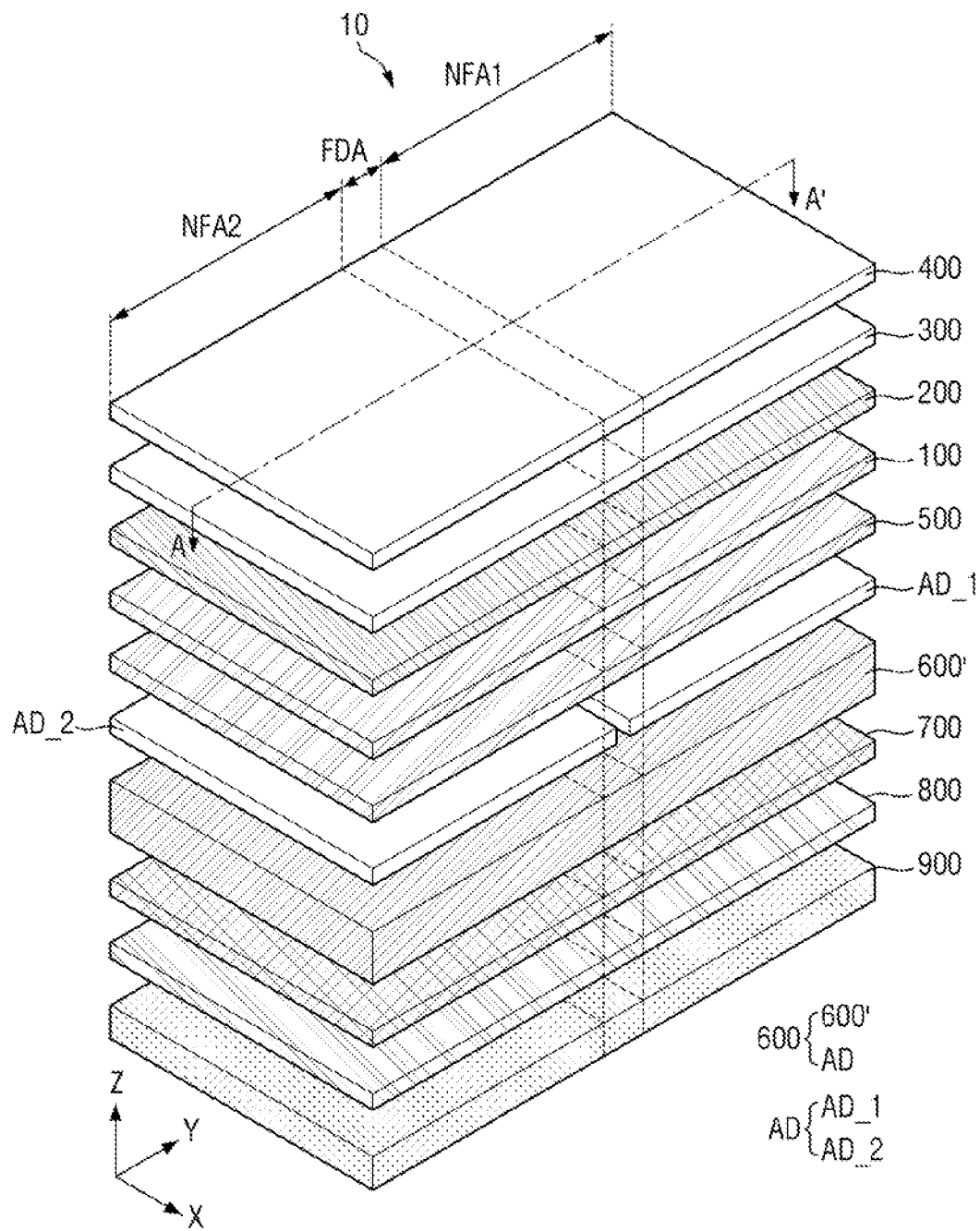
FIG. 12 is an exploded perspective view showing another example of the display device of FIG. 1.

FIG. 12 is an exploded perspective view showing another example of the display device of FIG. 1.

The display device 10 of FIG. 12 is different from the embodiments of FIGS. 5 and 11 in that the adhesive auxiliary member AD includes a first adhesive auxiliary member AD_1 and a second adhesive auxiliary member AD_2. In the description of the embodiment with reference to FIG. 12, the differences from the embodiments of FIGS. 5 and 11 will be mainly described.

Referring to FIG. 12, the first adhesive auxiliary member AD_1 is disposed in the first non-folding area NFA1, and the second adhesive auxiliary member AD_2 is disposed in the second non-folding area NFA2. The width between the first adhesive auxiliary member AD_1 and the second adhesive auxiliary member AD_2 may be smaller than the width of the folding area FDA in the second direction (ex., the Y-axis direction). Accordingly, the folding stress of the display The first embodiment is the foldable display device 10 including the first adhesive layer 600 of the embodiment shown in FIGS. 9 and 10. In the first embodiment, the thickness of the first adhesive layer 600 was set to 25 µm.

The second embodiment is the foldable display device 10 including the first adhesive layer 600' shown in FIG. 11. In the second embodiment, the thickness of the first adhesive layer 600' was set to 25 µm, and the thickness of the adhesive auxiliary member AD was set to 5 µm.

Figure 13:
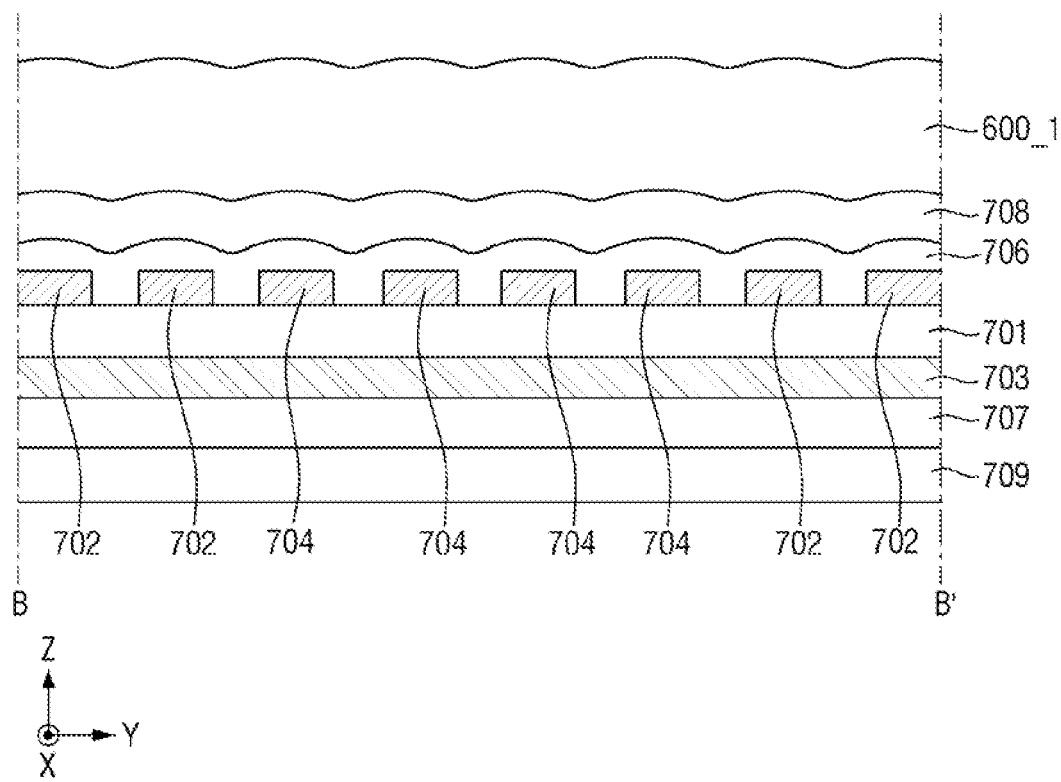
FIG. 13 is a cross-sectional view of a first comparative example of the first adhesive layer taken along line B-B' of FIG. 8.

The first comparative example is a foldable display device 10 including a pressure sensitive adhesive layer 600_1 as shown in FIG. 13. In the first comparative example, the thickness of the pressure sensitive adhesive layer 6001 was set to 25 µm. However, in the first comparative example, the pressure sensitive adhesive layer 600_1 is unlike the cured adhesive layer of the first embodiment.

For example, the pressure sensitive adhesive layer 600_1 may be a pressure sensitive adhesive tape or a pressure sensitive adhesive film. Therefore, the pressure sensitive adhesive layer 600_1 may be adhered in an uneven shape due to the stepped portion of the electrode patterns of the digitizer layer 700, and the panel protective film 500 disposed on the pressure sensitive adhesive layer 600_1 may also have an uneven shape. Accordingly, when the display device 10 is not displaying an image and high-intensity light is irradiated to the front surface of the display device 10, the uneven shape of the panel protective film 500 caused by the stepped portion of the wirings of the digitizer layer 700 may be visually recognized by a user on the front surface of the display device 10.

Figure 14:
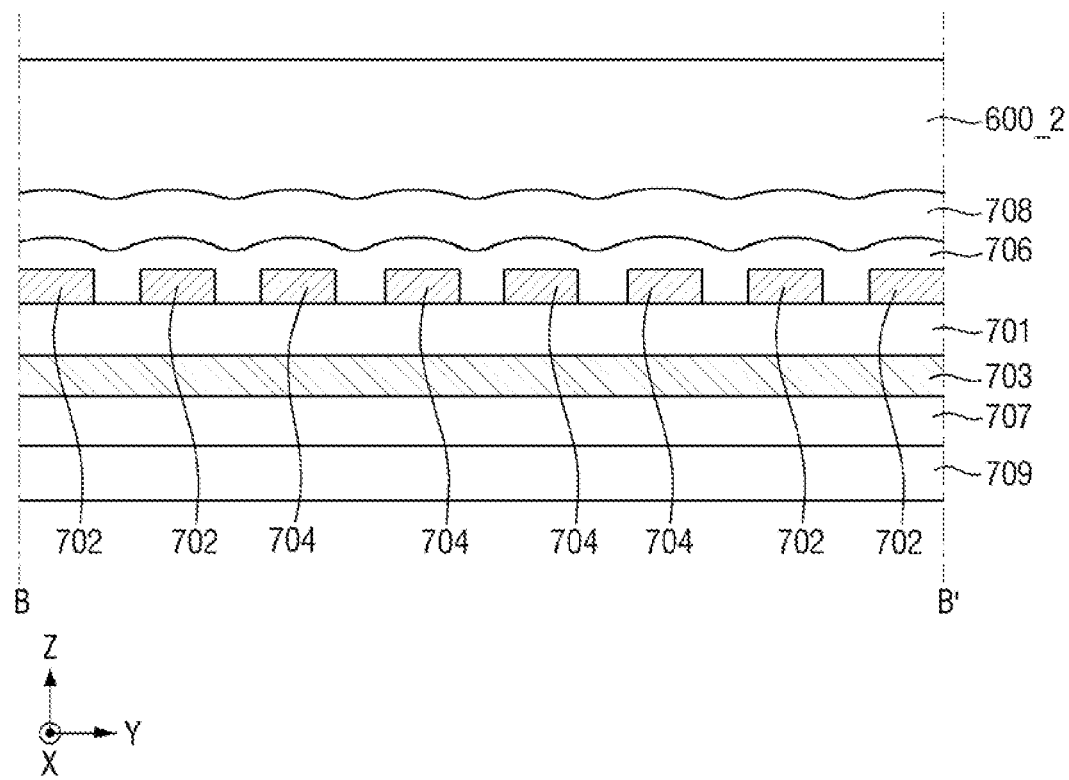
FIG. 14 is a cross-sectional view of a second comparative example of the first adhesive layer taken along line B-B' of FIG. 8.

As shown in FIG. 14, the second comparative example is a foldable display device 10 including a secondary addition curable pressure sensitive adhesive layer 600_2. In the second comparative example, the thickness of the secondary addition curable pressure sensitive adhesive layer 600_2 was set to 25 µm.

The secondary addition curable pressure sensitive adhesive layer 6002 may be coated in a liquid state on the digitizer layer 700. After the secondary addition curable pressure sensitive adhesive layer 600_2 is completely cured by the irradiation of ultraviolet rays, the secondary addition curable pressure sensitive adhesive layer 600_2 may be returned to semi-cured state by hot melting at a temperature of 80° C. to 100° C. By coating the secondary addition curable pressure sensitive adhesive layer 600_2 in a liquid state on the digitizer layer 700, the front surface of the secondary addition curable pressure sensitive adhesive layer 6002 may become flat, similarly to the first embodiment and the second embodiment.

Since, however, the secondary addition curable pressure sensitive adhesive layer 6002 has a storage modulus of 2 MPa, which is greater than 0.2 MPa, at a low temperature of −20° C. or lower, the display device 10 including the secondary addition curable pressure sensitive adhesive layer 600_2 may not be easily bent when folded. Therefore, the second comparative example requires an additional pressure sensitive adhesive to reduce the storage modulus at a low temperature of −20° C. or lower. Accordingly, the processing cost of the display device 10 according to the second comparative example of FIG. 14 may be increased.

The storage modulus was measured based on the shear rate of the adhesive layer by a rheometer at −20° C. and −50° C.

A "recognition of wiring" in the table indicates whether or not the circuit wirings of the digitizer are visually recognized on the display surface of the display device.

A surface quality indicating a degree of flatness of the front surface of the display device was measured using Optimap of Rhopoint Instruments. The surface quality was measured as a curvature value K by a phase stepped deflectometry (PSD) technology, which includes a white light source technology using white light having a wavelength range of 1.0 mm to 3.0 mm. As the curvature value K becomes smaller, the surface becomes flatter. As the curvature value K becomes smaller, the surface quality metric decreases in number, indicating a flatter surface.

In a folding test, a process from folding to unfolding of the display device was defined as one cycle of a folding process, and the "frequency of folding" determined by performing folding cycles until the digitizer of the display device did not operate normally.

Referring to Table 1, the first adhesive layer produced according to the first embodiment has a storage modulus of 0.1 MPa at −20° C. and 0.4 MPa at −50° C., and thus may be easily folded. The display device produced according to the first embodiment is expected to be foldable about 400,000 times. Further, there is no wiring recognition that may occur due to the electrode pattern of the digitizer layer 700, and the surface quality is excellent.

The first adhesive layer produced according to the second embodiment has a storage modulus of 0.1 MPa at −20° C. and 0.4 MPa at −50° C., and thus may be easily folded. Accordingly, the display device produced according to the second embodiment is expected to be foldable about 400,000 times. Further, there is no wiring recognition that may occur due to the electrode pattern of the digitizer layer 700, and the surface quality is increased.

Since the pressure sensitive adhesive layer produced according to the first comparative example has a storage elastic modulus of 2 MPa at −20° C. and 50 MPa at −50° C., the display device of the first comparative example may not be easily bent. Accordingly, the display device produced according to the first comparative example is expected to be foldable about 200,000 times. Further, the uneven shape of the panel protective film disposed on the digitizer layer due to the stepped portion of the wirings of the digitizer layer results in wiring recognition, and the surface quality is 1.8 that is 6 times greater than that of the first embodiment and the second embodiment; that is, the surface curvature is much greater than the first embodiment and the second embodiment.

In the second comparative example, there is no wiring recognition that may occur due to the electrode pattern of the digitizer layer, and the surface quality is higher in the second embodiment than in the first comparative example. However, the secondary addition curable pressure sensitive adhesive layer produced according to the second comparative example has a storage modulus of 2 MPa at −20° C. and 38 MPa at −50° C., and thus may not be easily bent. Accordingly, the display device produced according to the second comparative example is expected to be foldable about 200,000 times.

As described with reference to Table 1, by coating the first adhesive layer 600 in a liquid state on the digitizer layer, the stepped portion on the front surface of the first adhesive layer 600 that may result from the stepped portion of the electrode pattern of the digitizer layer 700 may become flat, thereby preventing an uneven shape of the panel protective film. Accordingly, it is possible to prevent the wiring recognition issue on the front surface of the display device 10. Further, when $SiOCH_3CH_3—CH_2—CH_2—SiCH_3OCH_3OCH_3$ is contained due to the UV curing, the storage modulus is low at a relatively low temperature of −20° C. to −50° C. and, thus, the display device may be easily bent when folded.

Figure 15:
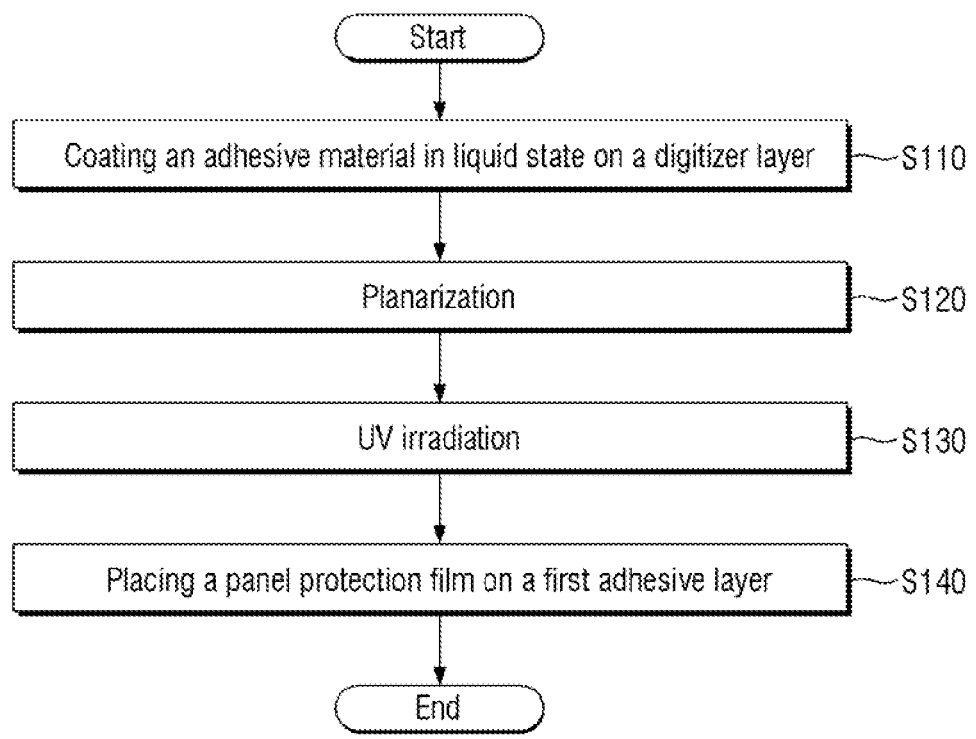
FIG. 15 is a flowchart showing a process of forming a first adhesive layer according to an embodiment.

FIG. 15 is a flowchart showing a process of forming a first adhesive layer according to an embodiment. FIGS. 16 to 19 are cross-sectional views taken along line B-B' of FIG. 8 illustrating a method of manufacturing a display device according to an embodiment. In the following, the process of forming the first adhesive layer of FIG. 15 will be described in detail with reference to FIGS. 16 to 19.

Figure 16:
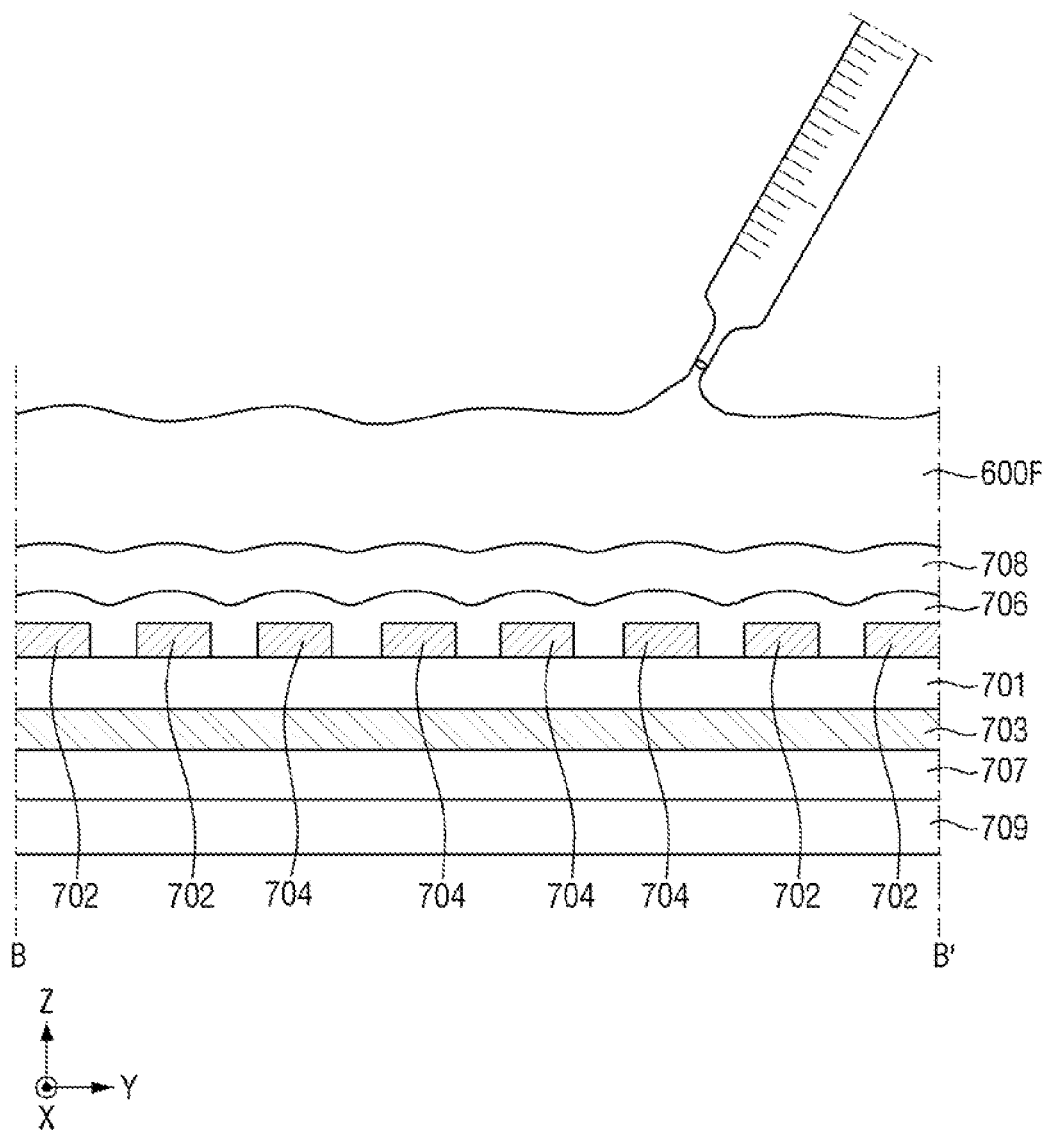
FIGS. 16 to 19 are cross-sectional views taken along line B-B' of FIG. 8 illustrating a method of manufacturing a display device according to an embodiment.

First, a liquid adhesive material 600F containing vinylsilane, hydrosilane, and a reaction retarder may be coated on the digitizer layer 700 as shown in FIG. 16 (step S110 in FIG. 15).

Figure 17:
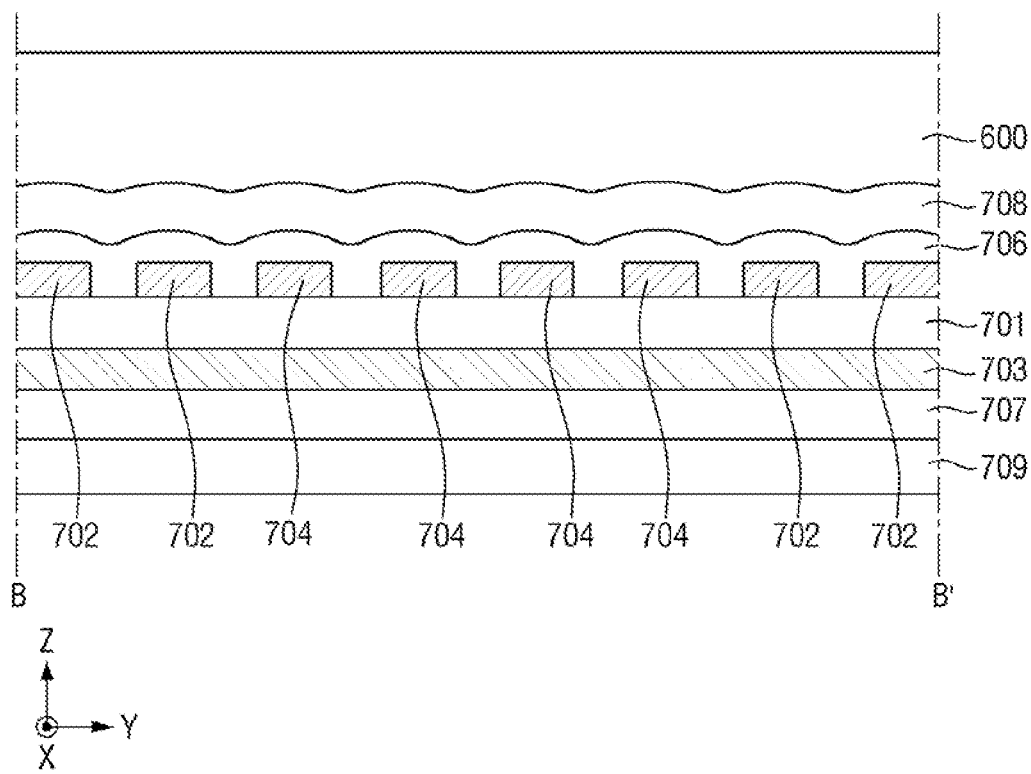

Second, as shown in FIG. 17, the front surface of the first adhesive layer 600 may become flat as a predetermined period of time elapses because the adhesive material 600F was coated in a liquid state on the digitizer layer 700. The predetermined period of time may be about 1 to 5 minutes (step S120 in FIG. 15).

Figure 18:
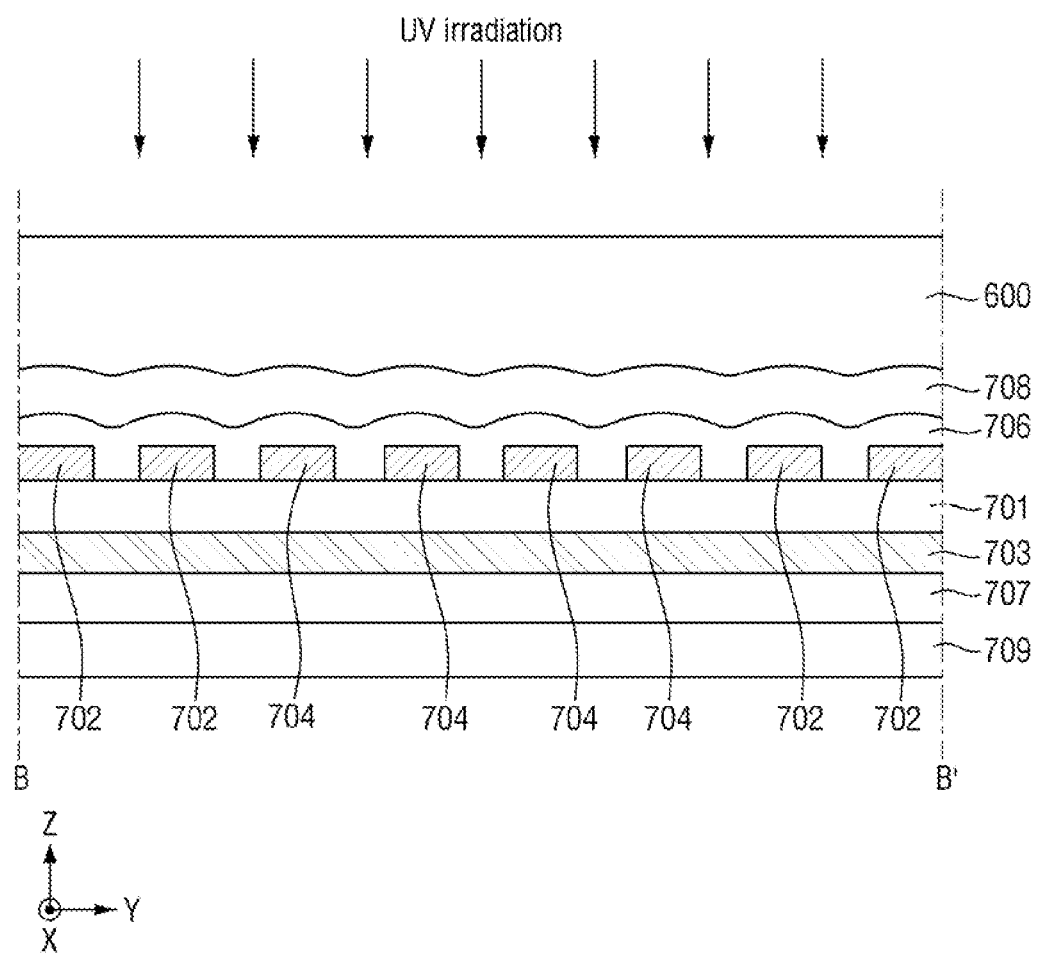

Third, as shown in FIG. 18, ultraviolet rays are irradiated onto the first adhesive layer 600, causing the vinylsilane and hydrosilane react and produce $SiOCH_3CH_3—CH_2—CH_2—SiCH_3OCH_3OCH_3$. Accordingly, the first adhesive layer 600 may be cured. Since, however, the first adhesive layer 600 contains the reaction retarder, the first adhesive layer 600 may maintain a semi-cured state for 30 minutes to 1 hour after the irradiation of ultraviolet rays (step S130 in FIG. 15).

Figure 19:
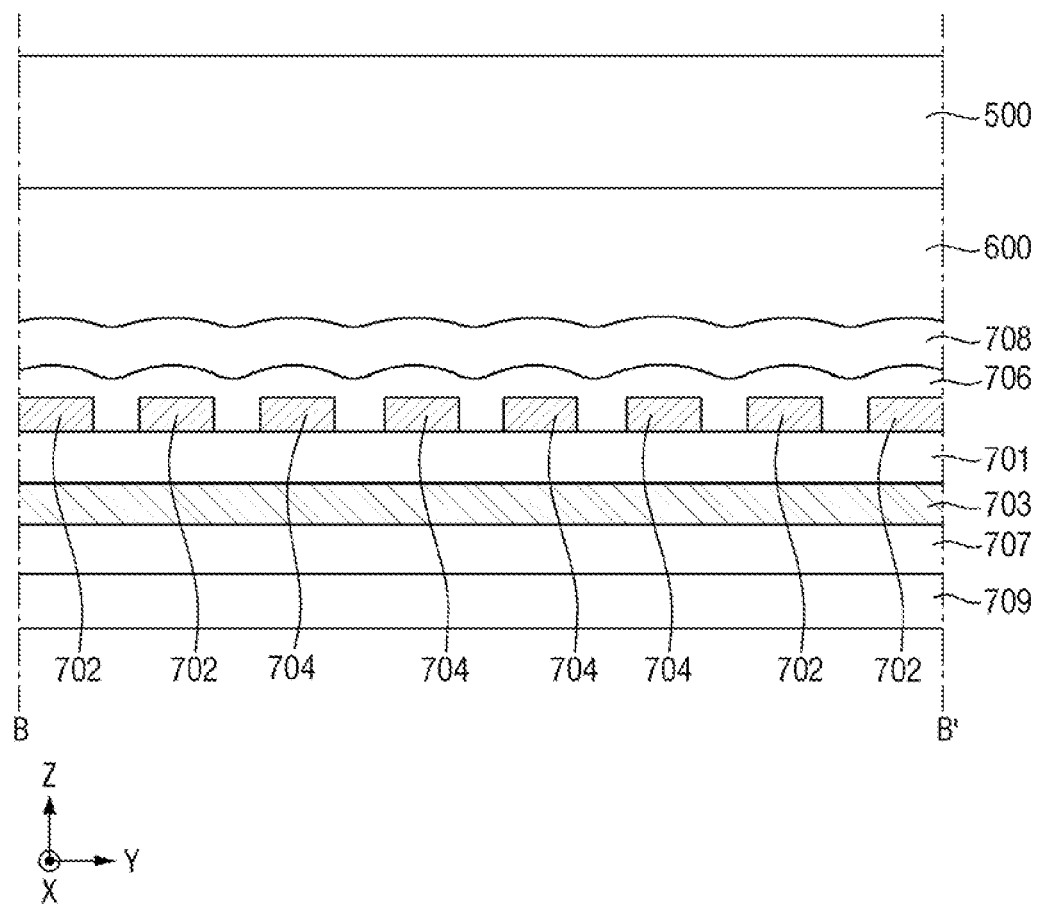

Fourth, as shown in FIG. 19, the panel protective film 500 may be disposed on the first adhesive layer 600. The panel protective film 500 may be disposed on the first adhesive layer 600 within about 30 minutes to 1 hour after the irradiation of ultraviolet rays to the first adhesive layer 600. For example, the panel protective film 500 may be disposed in a semi-cured state on the first adhesive layer 600 before the first adhesive layer 600 is completely cured, so that the panel protective film 500 may be adhered to the first adhesive layer 600 (step S140 in FIG. 15).

As shown in FIGS. 15 to 19, the first adhesive layer 600 is coated in a liquid solution state on the digitizer layer 700, so that the front surface of the first adhesive layer 600 may become flat as a predetermined period of time elapses. When the first adhesive layer 600 is made of silicon resin containing $SiOCH_3CH_3—CH_2—CH_2—SiCH_3OCH_3OCH_3$ and further contains a reaction retarder, the first adhesive layer

600 may maintain a semi-cured state for about 30 minutes to 1 hour after the irradiation of ultraviolet rays Hence, after the front surface of the first adhesive layer 600 becomes flat, the front surface of the first adhesive layer 600 may be adhered to the panel protective film 500. Therefore, even if the electrode patterns of the digitizer layer 700 have a stepped portion, the first adhesive layer 600 may not have an uneven shape. Accordingly, the panel protective film 500 disposed on the first adhesive layer 600 may also not have an uneven shape. As a result, when the display device 10 is not displaying an image and high-intensity light is irradiated to the front surface of the display device 10, it is possible to prevent the uneven shape of the panel protective film 500 caused by the stepped portion of the wirings of the digitizer layer 700 from being recognized by a user on the front surface of the display device.

Furthermore, when the first adhesive layer 600 is made of a silicon resin containing $SiOCH_3CH_3—CH_2—CH_2—SiCH_3OCH_3OCH_3$, the first adhesive layer 600 may have a low storage modulus at a relatively low temperature of −20° C. to −50° C. The first adhesive layer 600 may maintain the low storage modulus even at a relatively low temperature of −20° C. to −50° C., so that the first adhesive layer 600 may be easily folded at −20° C. to −50° C.

In the case of arranging the first adhesive layer 600 in a liquid state between the digitizer layer 700 and the panel protective film 500 and curing the first adhesive layer 600 by irradiating ultraviolet rays, the digitizer layer 700 disposed on the bottom surface of the first adhesive layer 600 would need to be transparent to transmit ultraviolet rays. Further, the panel protective film 500 disposed on the top surface of the first adhesive layer 600 and the display panel 100 would need to be transparent to transmit ultraviolet rays.

However, when the first adhesive layer 600 is made of silicon resin containing $SiOCH_3CH_3—CH_2—CH_2—SiCH_3OCH_3OCH_3$, the first adhesive layer 600 may maintain a semi-cured state for about 30 minutes to 1 hour after the irradiation of ultraviolet rays because the reaction retarder is contained therein. In this case, the panel protective film 500 may be adhered after the first adhesive layer 600 is coated in a liquid state on the digitizer layer 700 and then semi-cured by the irradiation of ultraviolet rays. Therefore, the digitizer layer 700 or the panel protective film 500 and the display panel 100 may be made of an opaque material that does not transmit ultraviolet rays.

While the present inventive concept has been particularly shown and described with reference to the embodiments thereof, it will be understood by those of ordinary skill in the art that various changes in form and detail may be made thereto without departing from the spirit and scope of the present inventive concept as set forth in the following claims.

What is claimed is:

1. A display device comprising:
a display panel configured to display an image on its front surface;
a digitizer layer disposed on a back surface of the display panel, wherein the digitizer layer is configured to generate a magnetic field using first electrode patterns and second electrode patterns; and
an adhesive layer disposed between the display panel and the digitizer layer, wherein the adhesive layer contains $SiOCH_3CH_3—CH_2—CH_2—SiCH_3OCH_3OCH_3$.

2. The display device of claim 1, wherein the adhesive layer includes a reaction retarder.

3. The display device of claim 2, wherein the reaction retarder includes any one of triphenylphosphine, tributylamine, tetramethylethylenediamine, benzotriazole, acetylenediol, a peroxide compound, and maleic acid.

4. The display device of claim 1, further comprising a pressure sensitive adhesive layer between the display panel and the adhesive layer.

5. The display device of claim 4, wherein the pressure sensitive adhesive layer has a thickness of 10 μm or less.

6. The display device of claim 4, wherein the display panel includes a folding area, a first non-folding area disposed on one side of the folding area, and a second non-folding area disposed on the other side of the folding area, wherein the folding area is capable of being bent such that the first non-folding area faces the second non-folding area without damaging the display panel.

7. The display device of claim 6, wherein the pressure sensitive adhesive layer includes:
a first pressure sensitive adhesive layer overlapping the first non-folding area in a thickness direction of the display panel and
a second pressure sensitive adhesive layer overlapping the second non-folding area in the thickness direction of the display panel,
wherein a gap between the first pressure sensitive adhesive layer and the second pressure sensitive adhesive layer overlaps the folding area in a thickness direction of the display panel.

8. The display device of claim 7, wherein the gap between the first pressure sensitive adhesive layer and the second pressure sensitive adhesive layer is less than a width of the folding area.

9. The display device of claim 1, further comprising a shielding member disposed on a back surface of the digitizer layer to shield the magnetic field of the digitizer layer.

10. The display device of claim 1, wherein the digitizer layer includes a base layer having the first electrode patterns disposed on its top surface, and the second electrode patterns disposed on its bottom surface, and
wherein each of the first electrode patterns is elongated in a first direction, and each of the second electrode patterns is elongated in a second direction crossing the first direction.

11. The display device of claim 10, wherein the adhesive layer has a storage modulus of 0.2 MPa or less at −20° C.

12. The display device of claim 11, wherein the adhesive layer has a storage modulus of 2 MPa or less at −50° C.

13. A display device comprising:
a display panel;
a digitizer layer disposed on one surface of the display panel, wherein the digitizer layer is configured to generate a magnetic field by first electrode patterns and second electrode patterns; and
an adhesive layer disposed between the display panel and the digitizer layer, wherein the adhesive layer contains $SiOCH_3CH_3—CH_2—CH_2—SiCH_3OCH_3OCH_3$.

14. A method of manufacturing a display device, comprising:
coating an adhesive material in a liquid state on a digitizer layer, the adhesive layer contains vinylsilane and hydrosilane;
changing the adhesive material into a semi-cured adhesive layer by irradiating ultraviolet rays onto the adhesive material, wherein in the forming of the adhesive material into the semi-cured adhesive layer by irradiating the ultraviolet rays onto the adhesive material, the vinylsilane and the hydrosilane are bonded to form $SiOCH_3CH_3—CH_2—CH_2—SiCH_3OCH_3OCH_3$ by the ultraviolet rays; and adhering a protective film to the semi-cured adhesive layer, wherein a display panel is disposed on the protective flint.

15. The method of claim 14, wherein the adhesive material further includes a reaction retarder.

16. The method of claim 15, wherein the reaction retarder includes any one of triphenylphosphine, tributylamine, tetramethylethylenediamine, benzotriazole, acetylenediol, a peroxide compound, and maleic acid.

17. The method of claim 16, wherein the semi-cured adhesive layer is maintained in a semi-cured state for 30 minutes to 1 hour by the reaction retarder.

18. The method of claim 14, wherein in the adhering of the protective film to the semi-cured adhesive layer, the protective film is adhered to the semi-cured adhesive layer using a pressure sensitive adhesive layer.

\* \* \* \* \*